(12) United States Patent
Velan

(10) Patent No.: US 9,243,853 B2
(45) Date of Patent: Jan. 26, 2016

(54) HEAT EXCHANGER

(75) Inventor: David Velan, Montreal (CA)

(73) Assignee: ECODRAIN INC., Montreal (CA)

( * ) Notice: Subject to any disclaimer, the term of this patent is extended or adjusted under 35 U.S.C. 154(b) by 167 days.

(21) Appl. No.: 13/329,949

(22) Filed: Dec. 19, 2011

(65) Prior Publication Data
US 2013/0153183 A1 Jun. 20, 2013

(51) Int. Cl.
F28F 9/00 (2006.01)
F28F 9/013 (2006.01)
F28F 9/02 (2006.01)
F28F 9/26 (2006.01)
F28F 13/12 (2006.01)
F28D 7/00 (2006.01)
F28D 7/10 (2006.01)
F28D 21/00 (2006.01)
F28F 1/02 (2006.01)
F28F 1/04 (2006.01)
E03C 1/044 (2006.01)
E03C 1/00 (2006.01)

(52) U.S. Cl.
CPC ............... *F28F 9/00* (2013.01); *F28D 7/0025* (2013.01); *F28D 7/10* (2013.01); *F28D 21/0012* (2013.01); *F28F 1/022* (2013.01); *F28F 1/04* (2013.01); *F28F 9/013* (2013.01); *F28F 9/0275* (2013.01); *F28F 9/26* (2013.01); *F28F 13/12* (2013.01); *E03C 2001/005* (2013.01); *F28F 2265/16* (2013.01); *Y02B 30/566* (2013.01)

(58) Field of Classification Search
CPC ............... F28F 9/00; F28F 9/26; F28F 9/026; F28F 9/013; F28F 9/0275; F28F 1/022; F28F 1/04; F28F 13/12; F28F 13/06; F28F 13/08; F28F 2265/16; Y02B 30/566; E03C 2001/005; F28D 7/0025; F28D 7/0041; F28D 7/16; F28D 7/1653; F28D 7/1684; F28D 7/0008; F28D 21/0012; F28D 7/10
USPC ................................. 165/109.1, 177; 366/337
See application file for complete search history.

(56) References Cited

U.S. PATENT DOCUMENTS

| | | | | |
|---|---|---|---|---|
| 1,056,373 A | * | 3/1913 | Segelken | F22B 7/20 122/44.2 |
| 1,058,896 A | * | 4/1913 | Parsons et al. | F28F 13/12 138/38 |
| 2,650,801 A | * | 9/1953 | Collito | F25D 31/002 138/111 |
| 3,512,581 A | * | 5/1970 | Lawton | 165/81 |

(Continued)

FOREIGN PATENT DOCUMENTS

| | | | | |
|---|---|---|---|---|
| EP | 257220 A1 | * | 3/1988 | F28F 13/12 |
| JP | 2009025002 | | 2/2009 | |

(Continued)

OTHER PUBLICATIONS

U.S. Appl. No. 12/846,588, Bose.

*Primary Examiner* — Tho V Duong
*Assistant Examiner* — Aaron Isenstadt
(74) *Attorney, Agent, or Firm* — Norton Rose Fulbright Canada LLP

(57) ABSTRACT

A heat exchanger comprising substantially square (rectangle) conduits featuring a screw like turbulator designed for square conduits. The tubes are designed for reclaiming heat from waste fluids. The tubes are substantially parallel to the flow direction of the waste fluid, thus resulting in a simple and cost effective construction.

20 Claims, 23 Drawing Sheets

(56) References Cited

U.S. PATENT DOCUMENTS

| | | | |
|---|---|---|---|
| 3,548,072 A | 12/1970 | Maschio | |
| 4,256,170 A * | 3/1981 | Crump | 165/154 |
| 4,602,672 A | 7/1986 | Kaufman | |
| 4,619,311 A | 10/1986 | Vasile | |
| 4,821,793 A | 4/1989 | Sheffield | |
| 5,791,401 A * | 8/1998 | Nobile | E03C 1/00 137/247.41 |
| 6,164,813 A * | 12/2000 | Wang | B01F 3/0853 366/339 |
| 7,096,885 B2 | 8/2006 | Van Decker | |
| 7,694,717 B2 * | 4/2010 | Bonner et al. | 165/80.1 |
| 2003/0048694 A1 * | 3/2003 | Horner | B01F 5/0617 366/337 |
| 2004/0159110 A1 * | 8/2004 | Janssen | F24D 3/18 62/77 |
| 2005/0121179 A1 * | 6/2005 | Shibagaki et al. | 165/153 |
| 2007/0095514 A1 | 5/2007 | Inoue et al. | |
| 2007/0163762 A1 | 7/2007 | Studer | |
| 2008/0000616 A1 * | 1/2008 | Nobile | E03C 1/00 165/47 |
| 2009/0056919 A1 * | 3/2009 | Hoffman et al. | 165/109.1 |
| 2010/0097883 A1 * | 4/2010 | Habibi-Naini | B01F 5/0615 366/337 |
| 2011/0094708 A1 | 4/2011 | Cardone | |
| 2012/0145362 A1 * | 6/2012 | Harrington | 165/109.1 |

FOREIGN PATENT DOCUMENTS

| | | |
|---|---|---|
| WO | 2005078369 | 8/2005 |
| WO | 2011127574 | 10/2011 |

* cited by examiner

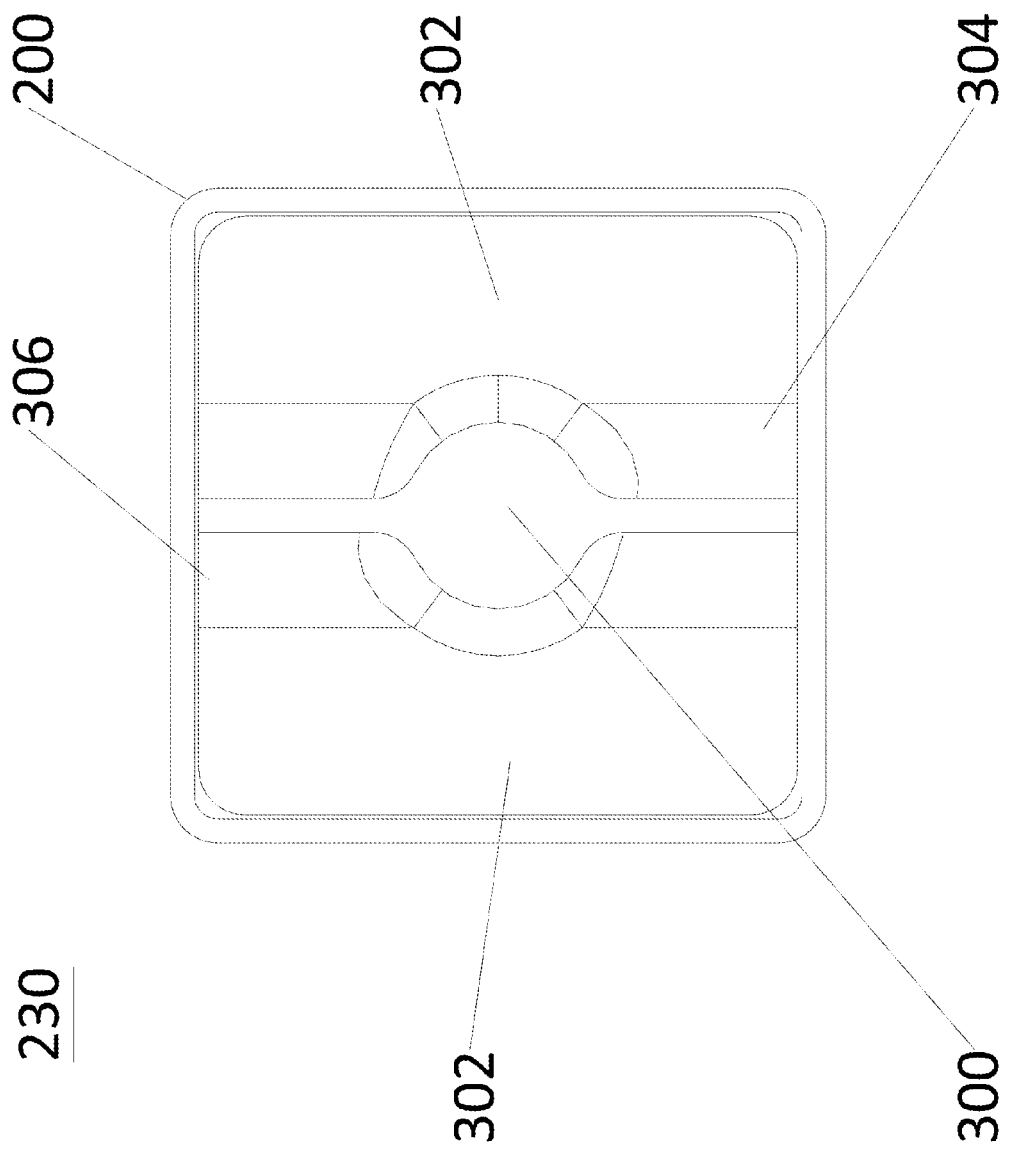
Fig. 6.A.

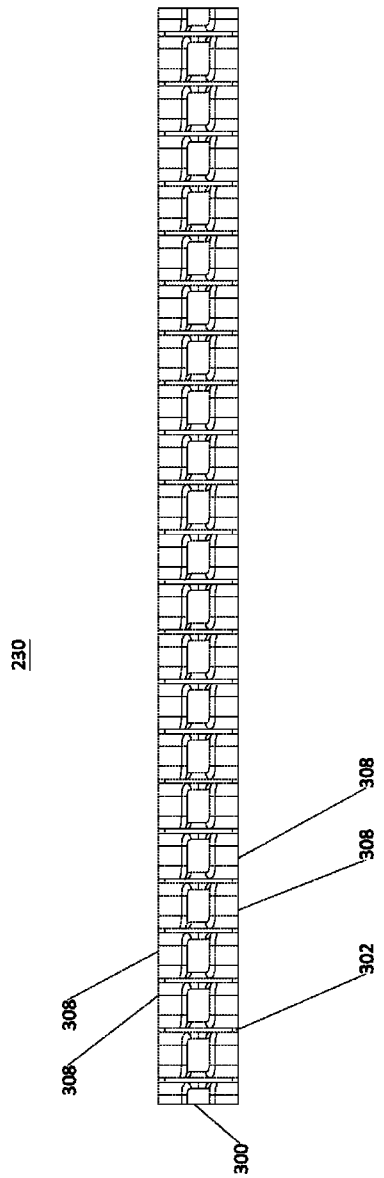
Fig. 6.B.

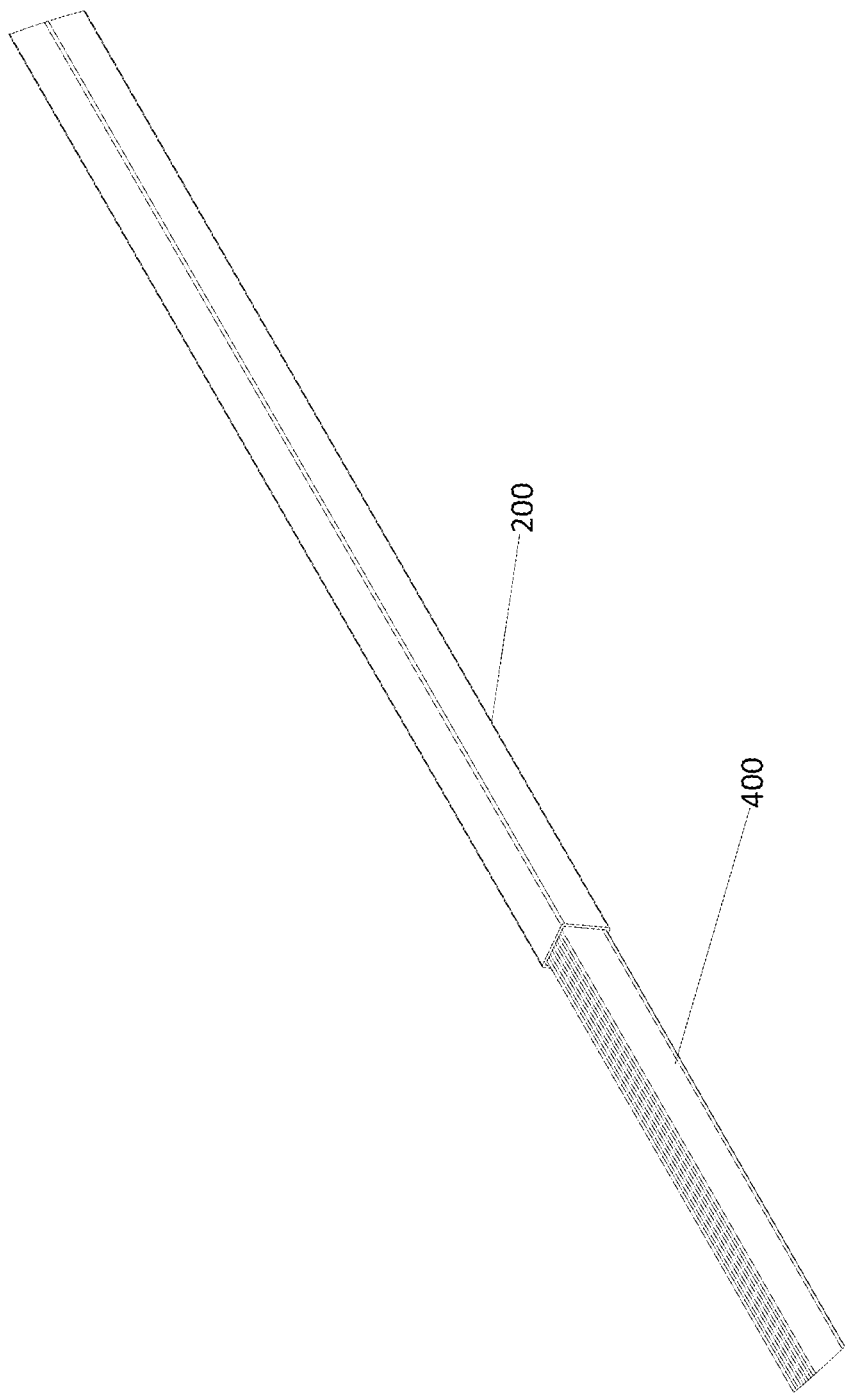

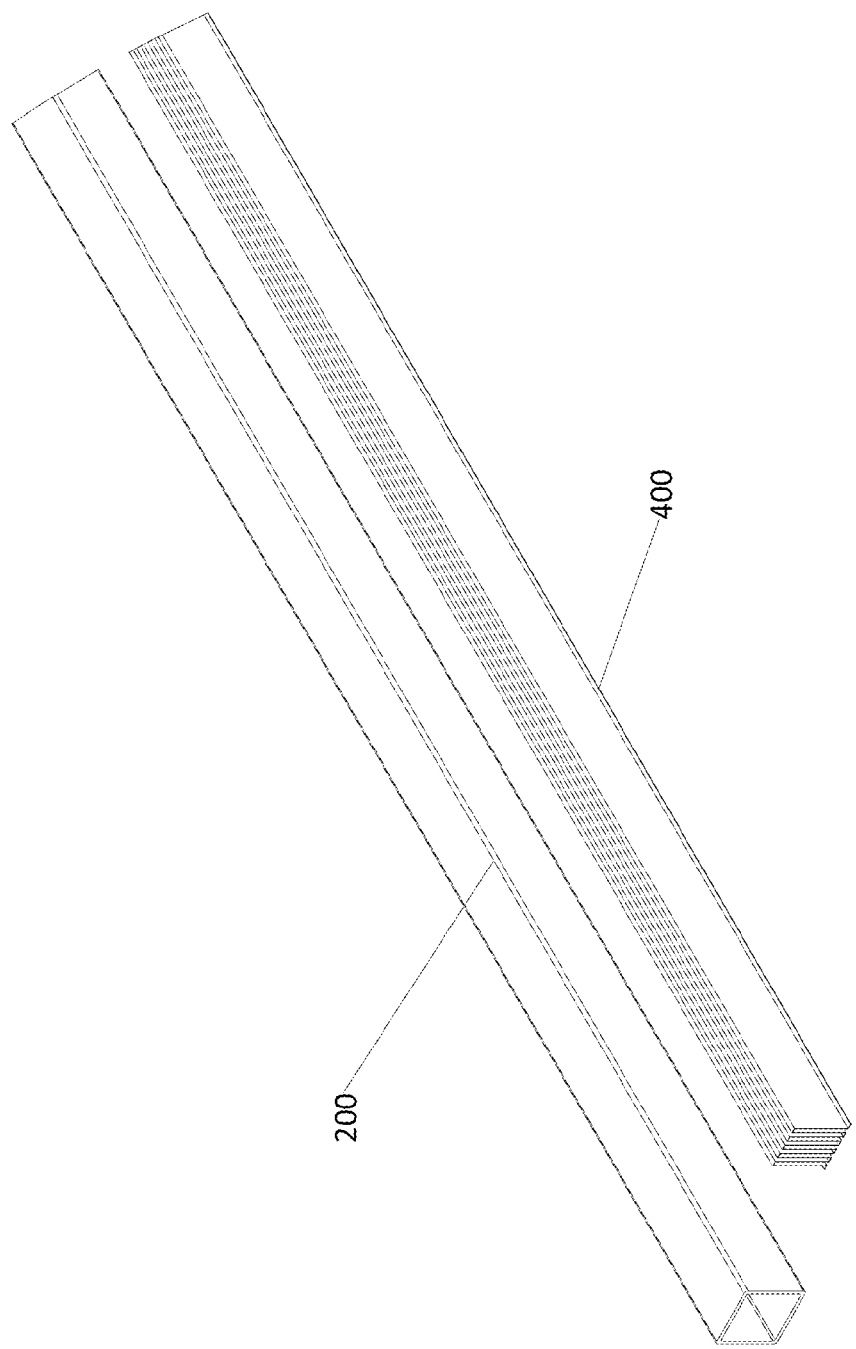
Fig. 8.B.

HEAT EXCHANGER

BACKGROUND OF THE INVENTION

Water, or other similar fluids, is often used either for cleaning or cooling a machine, object, person, animal, or other entity. In the process of cleaning or cooling, water is often heated. The heated water is then rejected to the environment still warm. The energy contained in the waste water as it enters the environment can be considered heat pollution and so it is desired to remove this heat. Additionally, the heat in the waste water often has economic value, as it can be used to preheat another fluid and save energy on heating costs.

Recovering useful heat from waste water at a cost that is lower than the cost of the energy produced poses several challenges. Since water freezes at 0 C and boils at 100 C, there is a relatively small temperature range at which it exists at ambient pressure. One of the primary drivers of heat transfer is the temperature difference between the hot fluid, and the cold fluid to which the heat is being transferred. When the temperature difference is low, the heat transfer potential is limited. Additionally, the hot waste fluid typically is at ambient pressure and slow moving. Typically slow moving fluids at ambient pressure have low rates of heat transfer and also have increased risk of fouling heat transfer surfaces. These characteristics thus lead to the desire to enhance the heat transfer characteristics of the heat exchanger. However, due to the limited heat exchange potential, there is also limited benefit in adding enhancements to the heat exchanger which can increase the cost.

The prospect of recovering waste and turning it into useful energy has captured the imagination of many inventors. However, due to the challenges described previously, almost none of these technologies has ever been practically implemented. One notable exception is a technology which includes a vertical copper drain pipe, with a copper coil wrapped around the outside. This technology was first patented by Vasile et al and marketed under the name Gravity Film Heat Exchanger GFX. The inventors noted that in a vertical drain line, waste water tends to cling to the walls of a pipe in a falling film. It was additionally noted that water in a falling film has a high heat transfer coefficient, meaning that it gives off its heat relatively well and thus the heat exchanger was relatively efficient. Additionally, since it was made primarily of standard plumbing copper components, it was simple enough to be implemented and sold in the marketplace. Since this original invention, there have been several imitators and several improvements of this core technology. However, the technology did have very important limitations. Due to its reliance on a falling film of waste water, it could only be installed in vertical orientation. Further to this, several parties have raised doubts about the effectiveness of such technology in actual real life installations. There is very little data that exists about the performance of these devices in real life installations. There is doubt that the falling film is an ideal scenario, primarily achieved in laboratory settings. In real-life installations, it may be the case that other factors may impact such a falling film and that some portion of the waste water will drain through the center of vertical pipe, without making contact with the walls, and thus will not transfer any heat.

A need for a heat exchanger that could be mounted horizontally to overcome the limitations of these vertical heat exchangers was disclosed by Crump. Crump observed that drain pipes are typically oversized. Thus in normal operation, when a fluid is passing through a drain pipe, the drain pipe is not full. In the case of a horizontal drain pipe, the fluid tends to fill the bottom $\frac{1}{3}^{rd}$ of the pipe. Crump thus disclosed several versions of a pipe in pipe heat exchanger designed to extract heat only from the bottom portion of a drain pipe. Specifically, Crump disclosed a double pass, and triple pass, channel beneath the drain pipe. He also disclosed a serpentine channel. Although there is no data provided by Crump on heat transfer efficiency of his heat exchangers, it is not likely that such a design would provide much heat transfer. The reason for this is that the cold water in the channel below the drain pipe is not mixed in any way. The cold water channel will have a large temperature gradient. The water that is at the top of the channel will heat up, but because higher temperature water rises, very limited heat will travel to the water in the lower portion of the channel. There is nothing in the channel to force the cold water at the center and bottom of the channel to reach the top and contact the warm portion of the channel wall which is in contact with the warm drain pipe. Additionally, the choice of a pipe in pipe design makes the heat exchanger prohibitively expensive. Pipes require a given thickness in order to retain their shape against pressure. As the pipe gets larger, thicker walls are required. The wall thickness required to retain pressure for a large tube at the outside of the drain pipe will be significant, and much more than if the second channel had been made from a series of smaller tubes than one large tube. Thus although Crump did make some useful observations, there are many limitations to the heat exchanger that Crump designed, and there is no evidence that it was ever installed in the field.

Cardone discloses a similar concept to Crump, except that instead of a tube in tube design, he discloses a top plate with a structure beneath the top plate that forces water into a similar serpentine pattern as disclosed by Crump. Although heat transfer data is not disclosed in this application either, it suffers from the same limitations as the Crump design. There is nothing in the heat transfer channels beneath the top plate that force water in the center and bottom of the channel to make contact with the warm top plate. Thus each channel of the serpentine heat exchanger will have a large temperature gradient with only a very small portion of the channel actually exposed to the warm top plate. Additionally, as in the Crump design, there also are limitations on the usefulness of the device due to its proposed construction. In one embodiment, Cardone discloses a large top plate that is a pressure containing wall. This requires a very thick and expensive plate as well as risky and difficult joining of the large top plate to the serpentine structure. Another embodiment disclosing tubes is disadvantageous due to the large number of welds required to make a serpentine structure using cut and welded tubes.

Studer additionally discusses a heat exchanger primarily designed to recapture waste heat from a horizontal drain pipe. However, the Studer patent application is concerned with placing a sheet of copper into a sewer pipe. The copper plate kills bacteria. In some regions, copper is not accepted as a sewer material and so the addition of copper sections near the heat transfer surfaces is necessary to kill bacteria that could foul the heat transfer surfaces. The present application is concerned with recapturing waste heat in a similar fashion except before reaching the sewer. In this case, where copper is required for its bacteria killing properties, it is typically accepted.

Disclosed herein is the addition of a turbulator to the cold fluid channels of the heat exchanger. Some of the functions of such a turbulator can be to heat the water at every level throughout the cold channel, not just on the top surface, and also to simplify the overall construction of the heat exchanger in order to reduce its cost.

In so far as a turbulator is a key component of this patent application, it is important to discuss prior art related to this.

Maschio discloses a screw type insert into an oil filled electrical cable in order to locally increase the ability of the oil to absorb heat from the cable. The screw like insert into the round channel forces the oil to travel in a helical flow pattern. This increases the local heat transfer characteristics of oil and thus it is able to provide greater local cooling. However, this device disclosed by Machio is a simplistic device that only allows one helical flow path through cable. Although it is not disclosed how such a device is fabricated, it requires the complicated process of converting a strip of material into a helix. An improved turbulator specifically designed for a heat exchanger is thus required.

Based on these limitations in the prior art, we have developed an improved heat exchanger and turbulator combination. This combination results in a highly effective heat transfer performance as well as a cost effective design.

SUMMARY OF FIGURES

FIG. 6.A. is a front view of a turbulator.

FIG. 6.B. is a side view of a turbulator.

FIG. 8.A. is an isometric view of another turbulator being inserted into a tube.

FIG. 8.B. is an isometric view of another turbulator.

DETAILED DESCRIPTION

Definitions

The singular forms "a", "an" and "the" include corresponding plural references unless the context clearly dictates otherwise.

As used herein the term "fluid" is intended to mean gas or liquid. Examples of liquids suitable for use with the heat exchangers described herein include, but are not limited to, water, hydraulic fluid, petroleum, glycol, chemicals, oil and the like, and steam. One example of a gas includes combustion engine exhaust gases.

As used herein, the term "water" is illustrative and not intended to limit the scope of the functioning of devices described within. In any given usage, the term water can be replaced with the term fluid.

As used herein, the term "turbulator" when referring to a either a surface or to an insert having a surface that acts as a turbulator, is intended to mean that the surface has a plurality of projections extending away from the surface. Surface turbulators and inserted turbulators are used to increase convection rates and heat transfer coefficients at heat exchange surfaces in fluid passageways in order to provide high performance in compact heat exchange assemblies, and to orientate fluids into a pre-defined direction often resulting in chaotic paths. Examples of types of turbulators include, but are not limited to, corrugations, peaks and troughs, nubbins, raised chevrons having a gap between, fish scales, raised zigzag moldings, meshes, criss-cross oriented wires, folded sheets of metal, porous materials such as metal foams and the like. Turbulators may comprise uniform or non-uniform surface profiles, textures, open cell structures, and shapes. Fluid passageway geometry allows control of fluid flow via solid or semi-solid mechanical structures and may be constructed from laminate composites, molded parts, and meshes of plastics, ceramics, metals and other materials. Specific examples of turbulators described herein, include a screw type turbulator, which is used in cold fluid passageways, and a folded fin type turbulator, which is also used in cold fluid passageways.

As used herein, the term "close thermal contact", "tight thermal contact" or "thermal contact" is intended to mean a joint between two surfaces that is close enough for direct conduction heat transfer to take place at a high rate. This can be achieved by solder, brazing, or welding the two surfaces together. It can also be achieved by gluing with a thermally conductive adhesive or gel. It can also be achieved by ensure a sufficient clamping force, and that the mating surfaces are flat and clean.

First Embodiment

Figure 1:
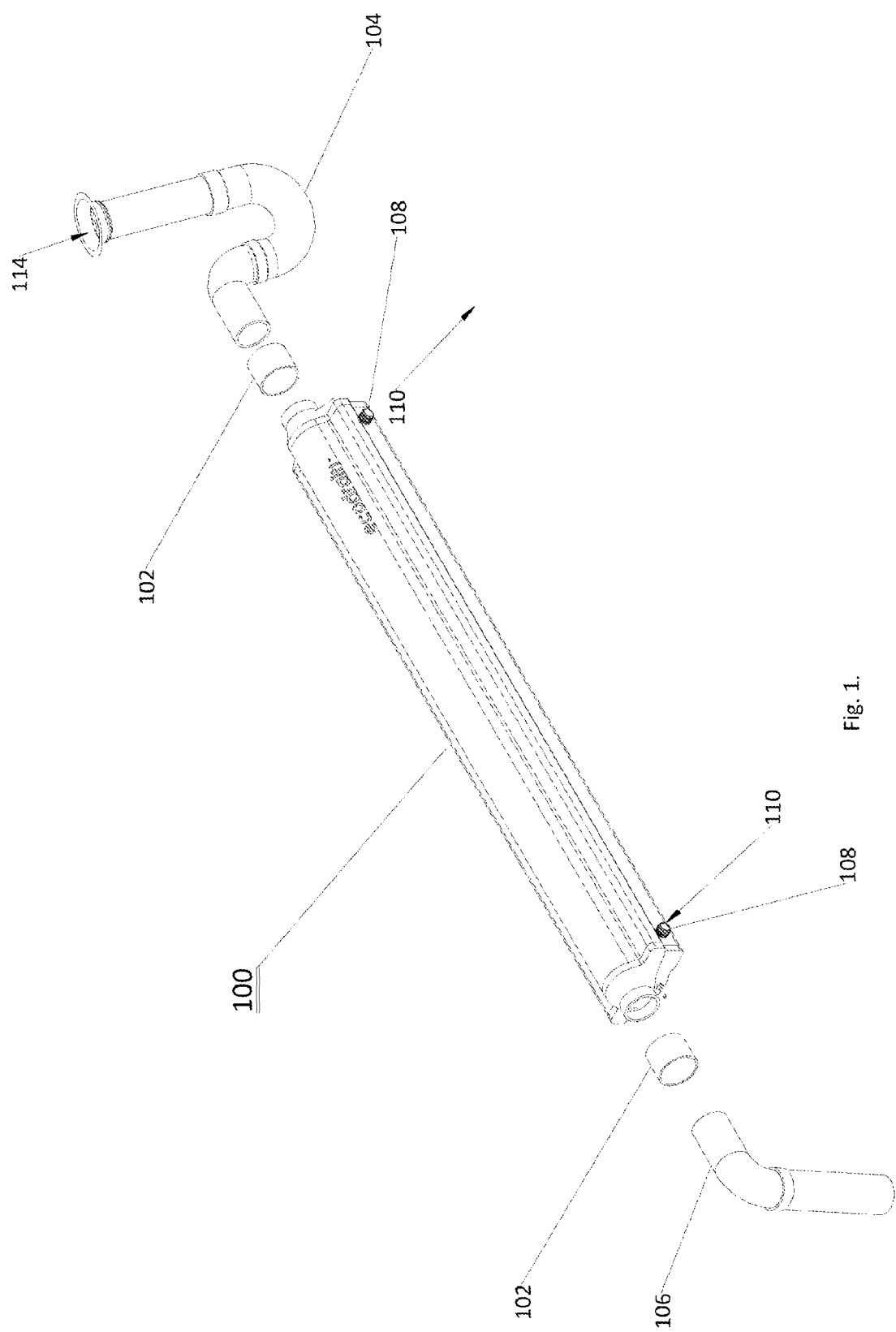
FIG. 1. is an isometric view of a heat exchanger in a piping system.

FIG. 1 depicts a heat exchanger 100 connected to a p-trap 104 via a drain pipe connector 102. The other end of the heat exchanger is connected to a drain pipe 106 by another drain pipe connector 102. Waste water 114 flows into the p-trap 104 from above. Cold water 110 flows into the heat exchanger 100 through a connector 108 at one end and exits through a second connector 108 on the other end.

Figure 2:
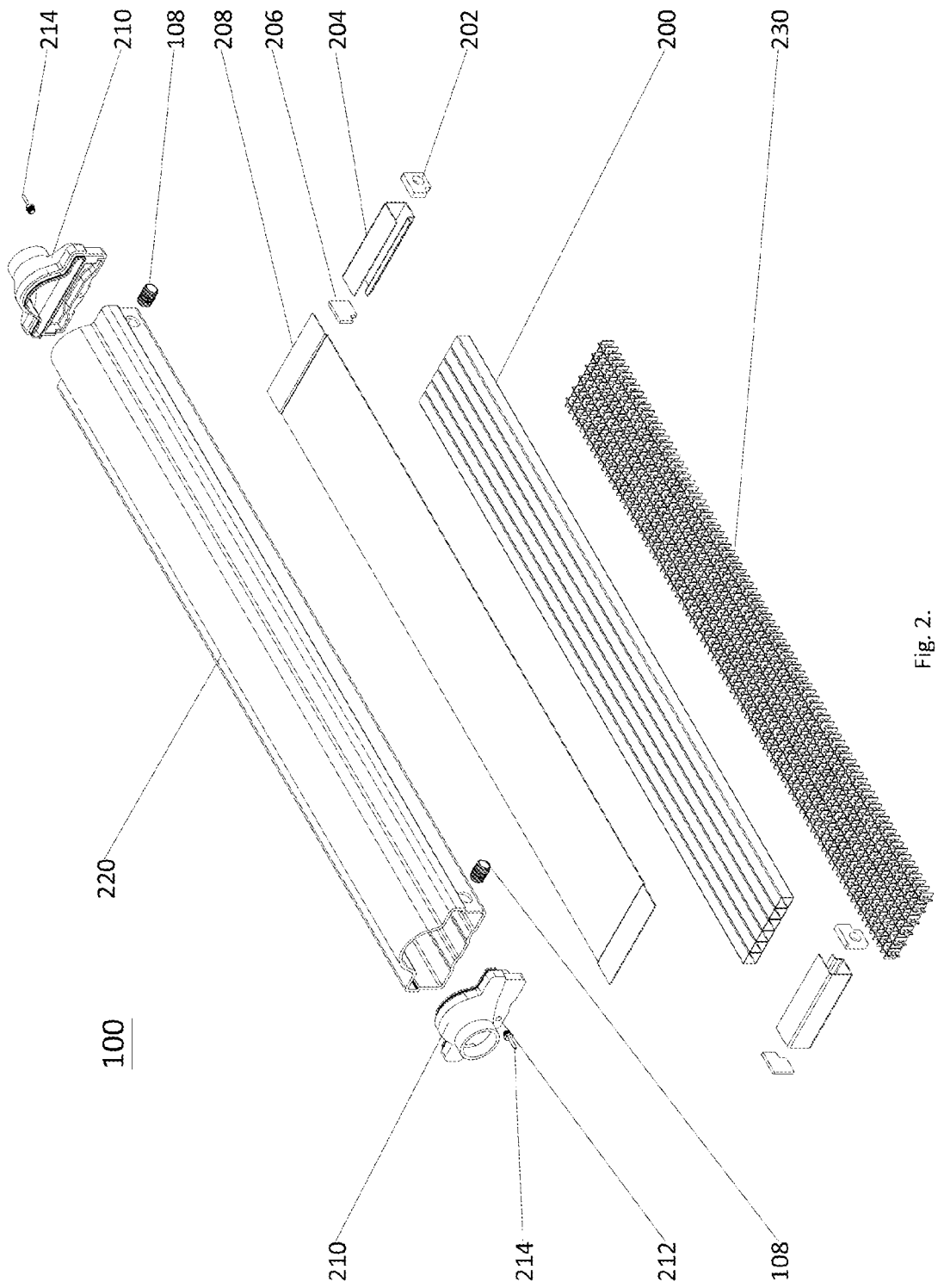
FIG. 2 is an exploded view of a heat exchanger.

FIG. 2 is an exploded view of the heat exchanger 100. Substantially square tubes 200 are joined together at each end by sealing along their mating faces. This sealing can be done by welding, soldering, brazing, gluing or any other suitable joining technique. Turbulators 230 are inserted into each tube 200. A manifold body 204, side cap 206 and connector cap 202 are joined to the square tubes 200 at each end by the same joining techniques mentioned before. A top plate 208 is attached to the top surface of the square tubes 200 and the manifold body 204. The plate 208 can be attached by soldering, brazing or with a thermally conductive adhesive between the plate 208 and the top surfaces of each tube 200. It may be advantageous to use a solder or braze paste, and apply a clamping pressure during the attachment process. It may also be advantageous to apply only the minimum amount of joining material such that there are tiny air gaps between the top plate and the tubes. The plate 208 can also be attached by welding the two outer square tubes 200 to the plate 208. Once the parts are joined, they are inserted into the box body 220. A sealant is used to join the top plate 208 to the box body 220. The sealant can be any suitable waterproof sealing agent such as a silicon or polyurethane caulking agent, or a waterproof epoxy. The end caps 210 are joined to the box body 220 using a sealant, adhesive or welding technique such as ultrasonic welding. The end caps 210 are also joined to the top plate 208, typically by gluing. A small leak-off hole 212 through the bottom end cap 210 is an optional feature. This leak-off hole can be connected to a leak off connector 214 which is a standard pipe fitting. Threaded connectors 108 are attached to the connector caps 202.

Figure 3:
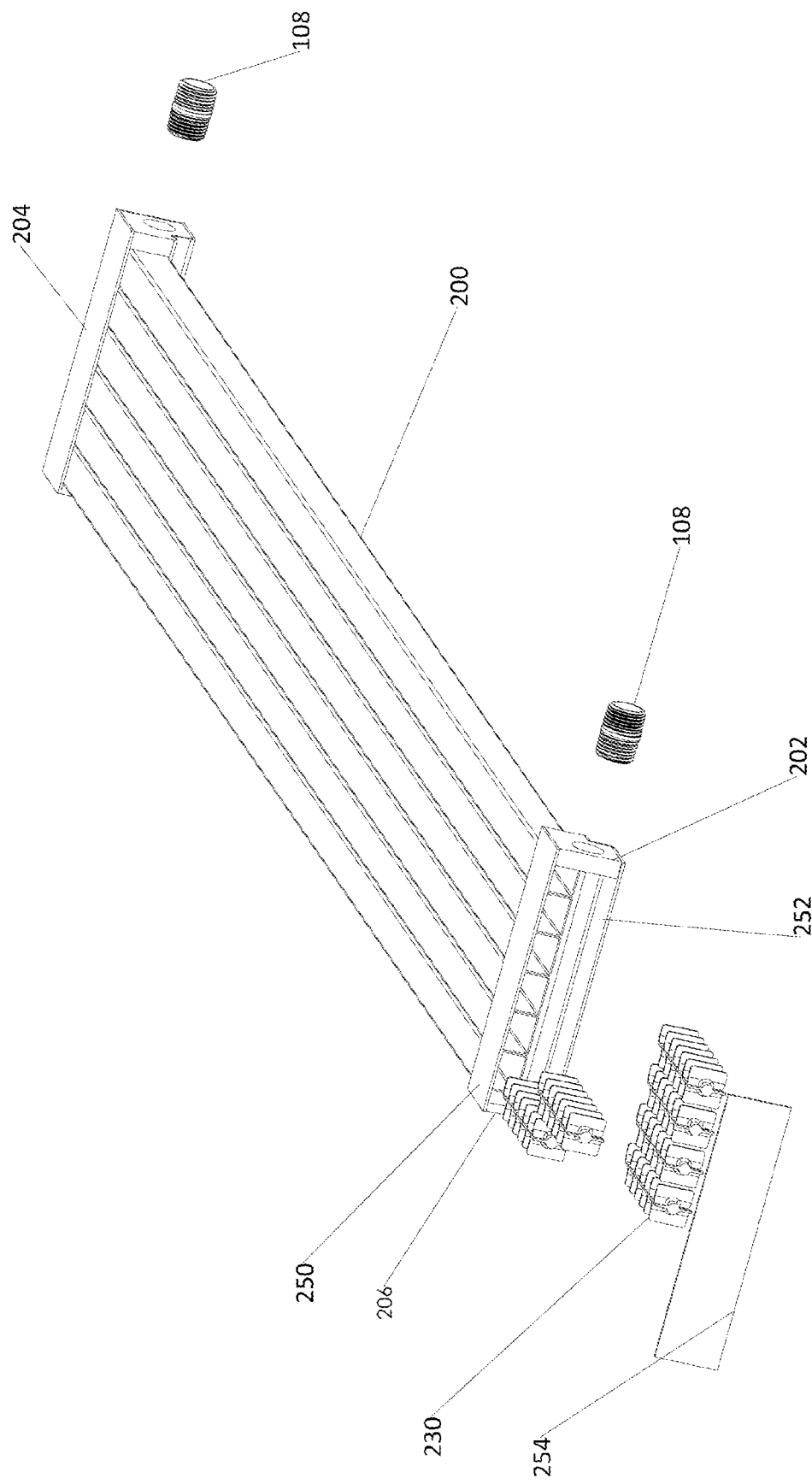
FIG. 3 is an isometric view of a heat exchanger during assembly.

FIG. 3 is an isometric view of the turbulators 230 being inserted into the square tubes 200. In some situations, it may be advantageous to insert turbulators 230 into the assembly after the manifold body 204, side cap 206 and connector cap 202 have been attached to the tubes. An example is when the turbulators 230 are made of plastic, and the manifold body 204 is joined to the square tubes by brazing, soldering or welding. In those cases, the manifold body 204 can be divided on one side into three pieces; a manifold top plate 250, a manifold back hatch 254, and a manifold bottom plate 252. The manifold top plate 250, the manifold bottom plate 252, the connector cap 202 and the side cap 206, are brazed, soldered or welded to the square tubes 230. In some cases, the top plate 208 can also be joined at this time. Then once the parts have cooled down, the turbulators 230 are inserted into the square tubes 200. Then the manifold back plate 254 is joined to the manifold top plate 250, the manifold bottom plate 252, the side cap 206 and the connector cap 202. It is also possible to make the manifold top plate 250, the manifold bottom plate 252, the side cap 206 and the connector cap 202 from a single sheet of material. The sheet is bent to make the same manifold shape. Then the back plate 254 is joined after the turbulators 230 have been inserted. It is also possible for the manifolds to be made of plastic. In that case, the manifolds are glued to the square tubes 200 and the turbulators 230 can be inserted into the square tubes 200 prior to gluing.

Figure 4:
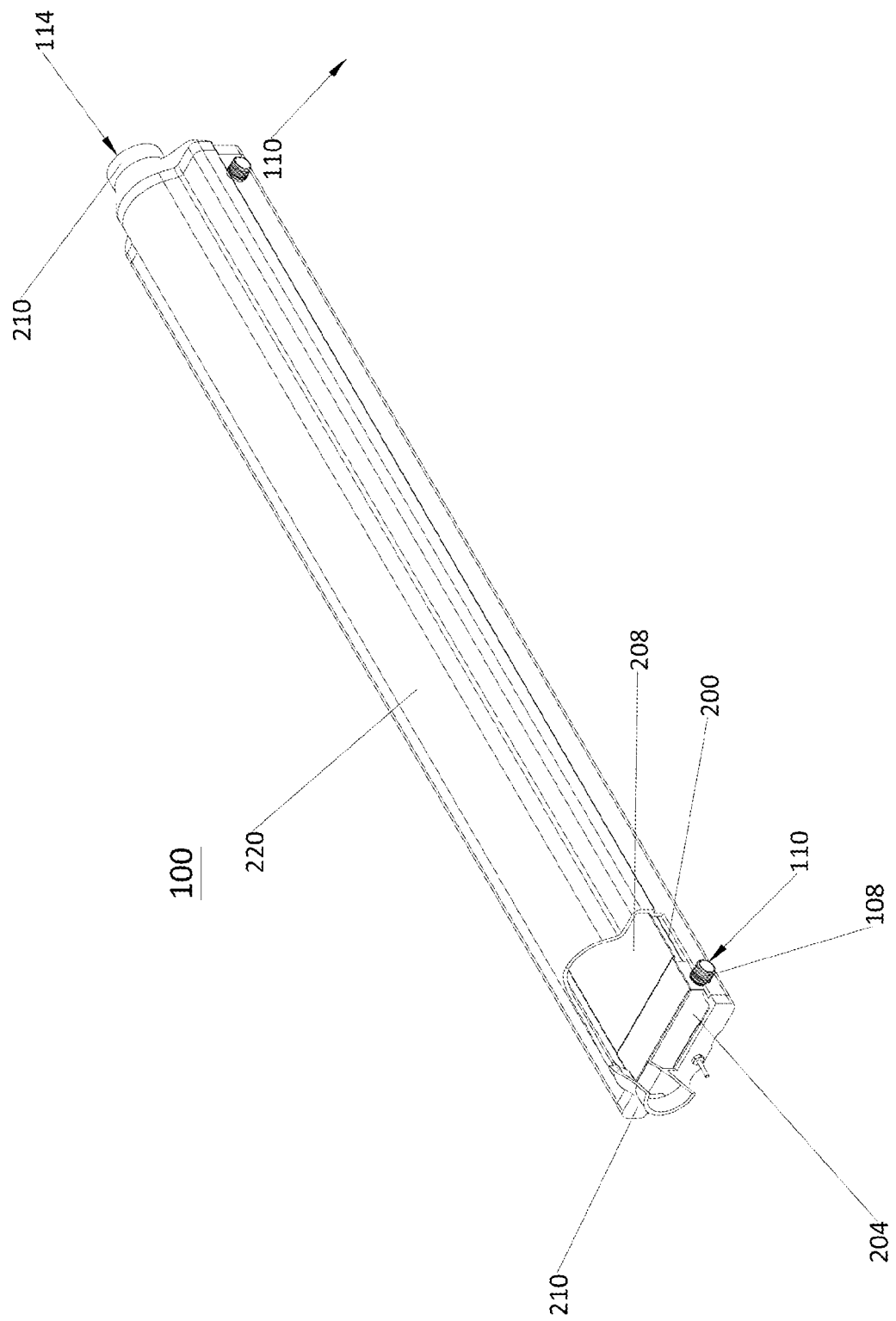
FIG. 4 is a cut view of a heat exchanger.

FIG. 4 is a cut view of a heat exchanger 100. Square tubes 200 are beneath a top plate 208. The top plate is sealed to the box body 220. End caps 210 are joined to the box body 220. This construction creates two distinct flow areas. One is the space between the top plate 208 and the top of the box body 220. Access to this chamber is through the end caps 210. Typically this flow area will be for a waste fluid 114. The second flow area is in the square tubes 200 beneath the top plate 208. Typically a clean pressurized fluid 110 will travel in this space. Access to this flow path is via the threaded connector 108 and the manifold body 204.

DETAILED DESCRIPTION

Turbulator

The turbulator is a variation of a threaded rod or Archimedes screw designed to be injection molded, and thus much less expensive to produce.

Figure 5:
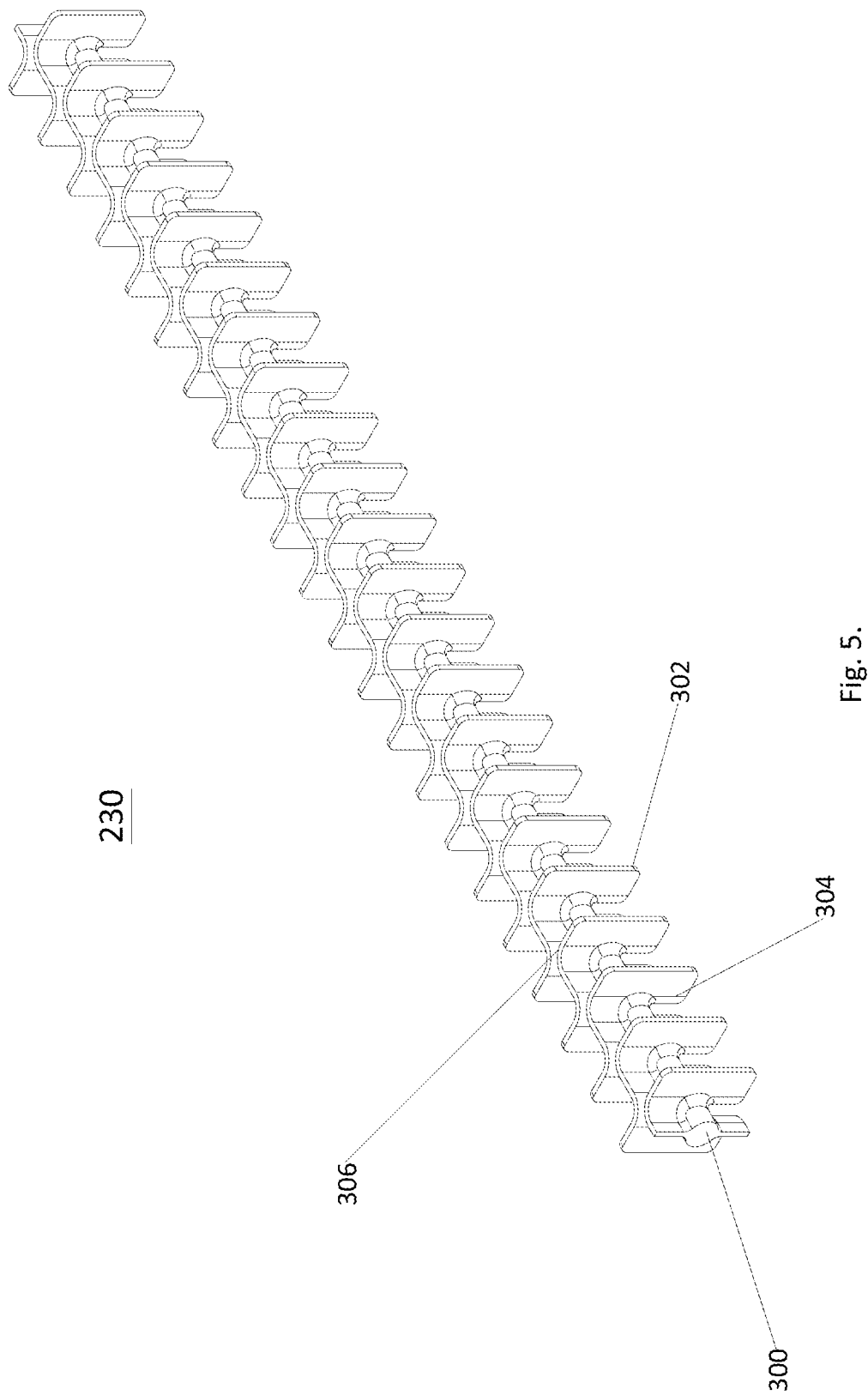
FIG. 5 is an isometric view of a turbulator.

FIG. 5 is an isometric view of a screw like turbulator 230. Vertical side walls 302 extend from a core 300 in a direction almost perpendicular to the lengthwise dimension of the core. A bottom gap 304 and a top gap 306 provide passageways for fluid above and below the core 300.

FIG. 6.A. is a front view of the screw like turbulator 230 inside a square tube 200. A core 300 is at the center of the screw like turbulator 230. Vertical side walls 302 extend from core 300 on both sides. The outer perimeter of the side walls 302 is flat and thus they make contact with the inner walls of the square tube 200. A bottom gap 304 and a top gap 306 are the only passageways for fluid as the vertical walls seal the rest of the inside of the tube 200 and block any flow.

FIG. 6.B. is a side view of the screw like turbulator 230. In-line walls 308 extend from the core 300, above and below, in a direction almost to parallel to the lengthwise dimension of the core. The perimeter of the in line walls 308 is flat and so that when the screw like turbulator 230 is inserted into a square tube, the in-line walls 308 contact the tube walls and block the flow of any fluid traveling inside the tube.

Figure 7:
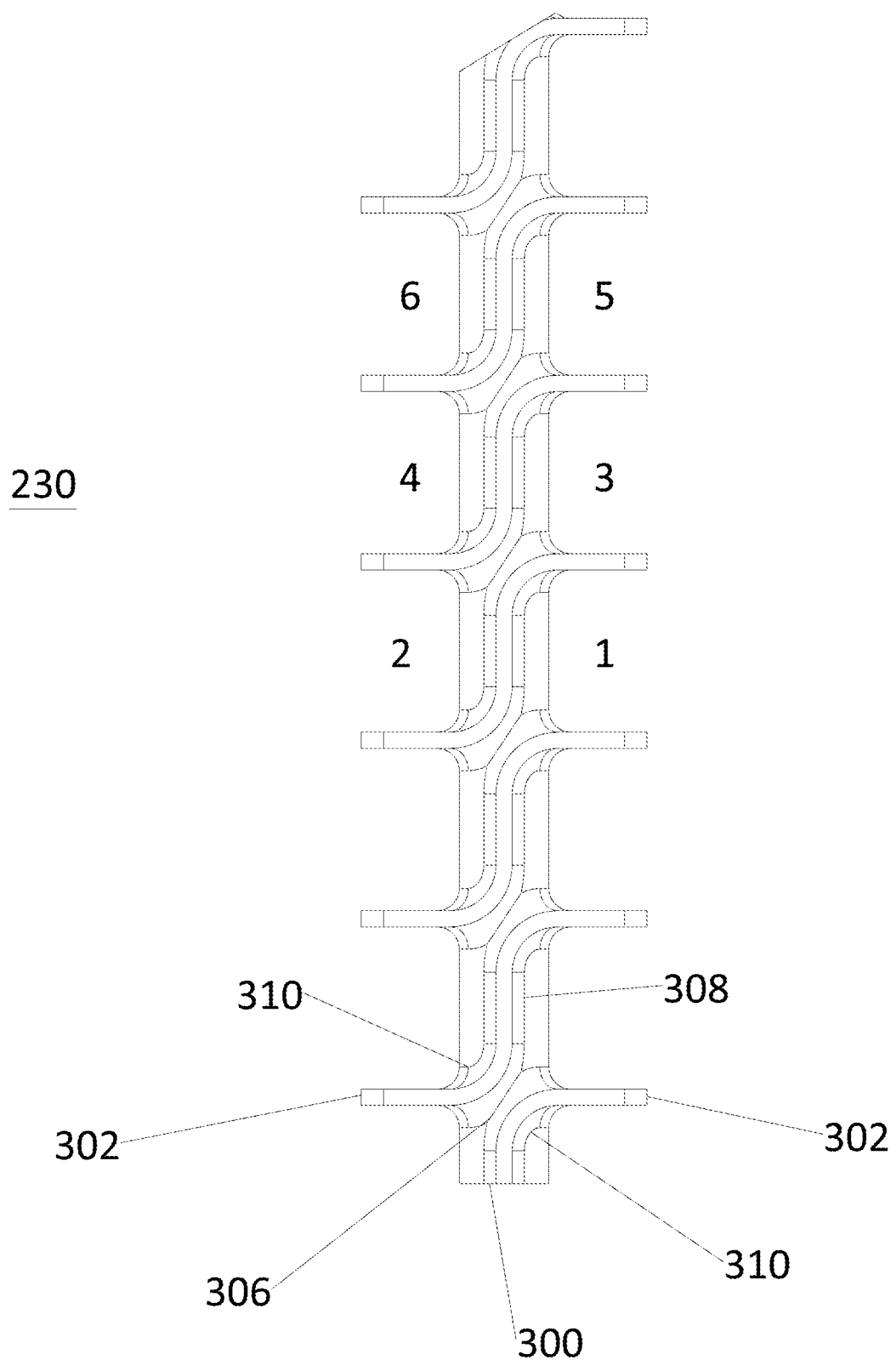
FIG. 7 is a top view of a turbulator.

FIG. 7 is a top view of the screw like turbulator 230. Vertical side walls 302 extend in a direction almost perpendicular to the lengthwise direction of the core 300. In-line side walls 308 extend in a direction almost parallel to the lengthwise dimensions of the core 300. The in-line walls 308 are connected to the side walls 302 by curved corner walls 310. A top gap 306 provides a passage for fluid over the top of the core 300. For greater clarity during the disclosure of the operation of the turbulator, consecutive chambers created by the screw like turbulator 230 and the inner walls of the square tube 200 have been labelled from 1 to 6. Each of these numbered chambers is a separate space with a single entry and a single exit.

Operation

First Embodiment

FIG. 1 shows a heat exchanger 100 connected to a p-trap 104 and a drain pipe 106 by drain pipe connectors 102. Waste water 114, as from a shower, enters into the drainage system, passes through a p-trap 104 and enters into the heat exchanger 100. FIG. 4 shows the waste water cavity of the heat exchanger 100 which comprises a box body 220 and a top plate 208 sealed to it. Waste water 114 enters into the waste water cavity through the end cap 210, and travels over the top plate 208, until it exits through the other end cap 210. Beneath the top plate 208 are a set of square tubes 200, better shown in FIGS. 2 and 3. A cold fluid 110 enters the square tubes 200 by connector 108. The cold fluid 110 passes through the tubes 200, typically by virtue of pressure within the fluid. An example is supply water that is pressurized at a municipal water works facility. As the cold fluid 110 passes inside the square tubes 200, it follows a circuitous path created by the screw like turbulators 230. The cold fluid 110 exits the heat exchanger 100 preheated. As warm waste fluid 114 passes over the top plate 208, it transfers heat to the cold fluid 110 inside the tubes, since the top plate 208 is in thermal contact with the tubes 200. The warm fluid 114 exits the heat exchanger cooled. In some cases, the primary function of the heat exchanger 100 may be to cool the waste fluid 114 before it enters the environment.

FIG. 2 also shows an optional leak-off hole 212 in the end cap 210. A leak-off connector 214 can be fitted into the hole 212 and connected to a tube. In the event that the heat exchanger 100 was to leak, the leak off hole 212 allows the user to control the direction of the leaking fluid.

Operation—Turbulator.

As shown in FIG. 6.A., when a screw like turbulator 230 is fitted tightly into a square tube 200, it creates alternate flow paths for a pressurized fluid through the square tube. For an incompressible fluid such as water, as it reaches the obstruction created by the turbulator side walls 302, it will seek to advance. The only paths available to advance are through the bottom gap 304 shown in FIG. 5 and the top gap 306 shown in FIGS. 5 and 7. In the present embodiment, there are two distinct paths through the tube 200 once the turbulator 230 is in place. Since the paths are of equal size, a pressurized fluid will split evenly into the two paths.

FIG. 6.A. shows a bottom gap 304 below the core 300 and a top gap 306 above the core 300. When pressurized fluid first enters the tube 200, it will be blocked by the vertical side walls 302. Half of the fluid will pass through the first top gap 306 and half will pass through the first bottom gap 304.

FIG. 7 shows a series of chambers created by the turbulator 230 fitted into the square tube 200. Since the fluid is pressurized and incompressible, it will be forced to advance. Fluid in chamber 1 can only advance by passing through a bottom gap 304 into chamber 4. Once in chamber 4, it can only advance by passing through the next top gap 306 into chamber 5. Similarly, fluid in chamber 2 can only advance by passing over a top gap 306 into chamber 3. From chamber 3, fluid can only advance by passing through a bottom gap 304 to chamber 6. Thus the fluid is forced to follow a helical path around the core 300 as it advances.

The combination of obstructions and gaps force the fluid to flow in a helical motion around the center core 300 of the turbulator 230. These new paths for the fluid have multiple effects related to heat transfer. They first of all increase the distance that the fluid has to travel. They also reduce the flow area that is available for the fluid to flow in. For incompressible fluids such as water, the result for a single tube with turbulator would be higher velocity of the water because the same amount of fluid must travel through a smaller area. However, since the turbulator design is typically intended to function with multiple tubes, the net result is not an increase of speed because the combined flow area of the multiple tubes with turbulators is similar to the flow area of a single tube without turbulator. Thus the result is that the fluid travels through a long distance, without picking up speed, and as a result has a long time to be heated. Additional effects that impact the heat transfer coefficient of the water may also be caused by the helical motion of the water, including the reduction of skin effects and the increase of local turbulence.

It should be noted that it is possible to modify the flow characteristics of the fluid traveling in the tube 200 with screw like turbulator 230 by modifying the characteristics of the turbulators 230. The first variable to modify is the number of simultaneous paths in the turbulator. In the current discussion, there were two paths. At the first entry point, half of the fluid passed above the core 300 and the other half passed below the core 300. With a minor modification, it would be possible to have only one helical path. In this case, at the first entry point, all of the fluid would travel either below the core, or above the core, but not both. There would be a single helical path around the core. Similarly, the turbulator could be modified to have 3 paths by having a side gap as well as a top and bottom gap. Multiple paths are available provided the space is available and the part can be molded.

In some cases, it may also be advantageous to plate the plastic turbulator with copper or other material with high rate of heat conductivity. In this case, besides providing the benefits mentioned previously, the turbulator can also act as a fin, transferring heat by direct conduction. Since the turbulator walls are in contact with the tube walls, as the tubes heat up, so too do the plated turbulators, increasing the effective heat transfer area of the heat exchanger.

By the description and images, it should be clear that the construction of the heat exchanger in combination with the turbulators is relatively simple. There are no bent tubes and there is very limited welding. Thus the combination of elements has produced a very simple construction relative to the prior art.

DETAILED DESCRIPTION

Another Turbulator Embodiment

FIG. 8.A. is an isometric view of the folded fin turbulator 400 being inserted into the square tube 200. FIG. 8.B. is an isometric view of a folded fin turbulator 400 and a square tube 200. The turbulator 400 is substantially the same length as the tube 200. The folded fin is preferably made from a material that has a good thermal conductivity. This shape is made by folding a sheet of metal typically in a fin-folding machine. Folded fins are well known in some heat transfer applications such as for dispersing heat in radiators and their fabrication is also well known.

Figure 9:
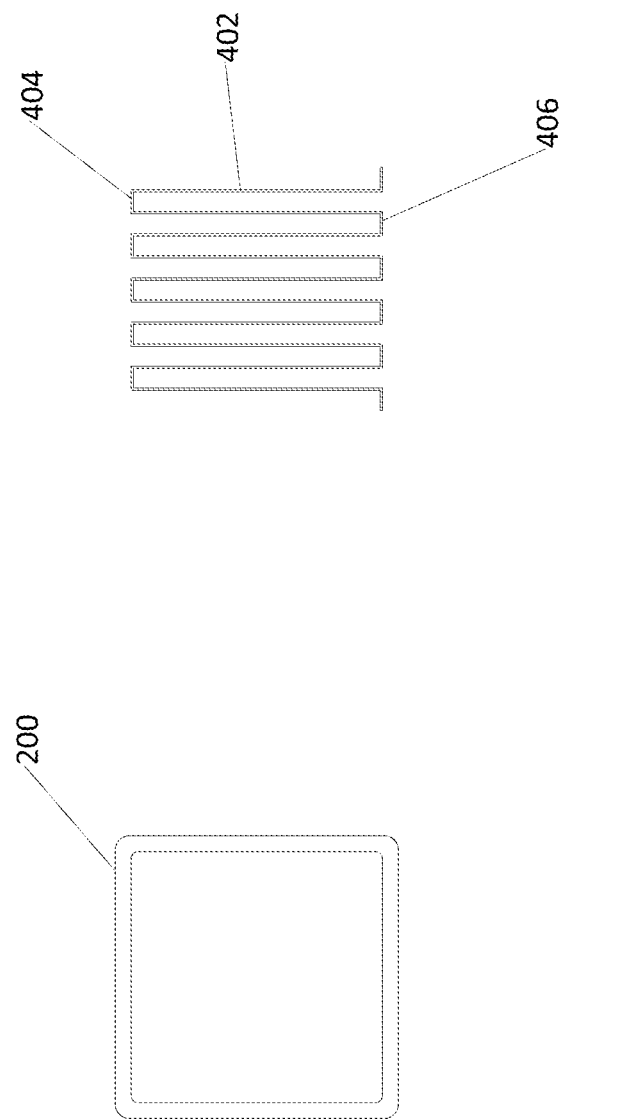
FIG. 9 is a front view of another turbulator.

FIG. 9 is a front view of the folded fin turbulator 400. The view shows that the turbulator has long side walls 402, and short top walls 404 and short bottom walls 406. When inserted into the square tubes, the flat tops 404 and flat bottoms 406 must be in tight thermal contact with the inner walls of the square tube 200. This can be done by adjusting the length of the side walls such that there is an interference fit. Once the folded fin turbulator 400 is inserted into the tube 200, several equally sized flow paths are created. These new flow paths are smaller than the original flow path through the square tube 200.

The folded fin turbulators can be inserted into the square tube 200 or modified square tubes 506 of any of the heat exchangers mentioned in this application in place of the other screw like turbulator 230. The construction of the heat exchangers is otherwise identical.

Operation

Another Turbulator Embodiment

FIG. 8.A. shows folded fin turbulators 400 inserted into a square tube 200. The folded fin turbulator 400 and square tube 200 combination is used in a heat exchanger such as that described in FIGS. 1,2,3 and 4. Waste water 114 travels over a top plate 208. Beneath the top plate 208, square tubes 200 carry a cool pressurized fluid 110. When the fluid 110 enters the square tube 200 and folded fin turbulator 400 combination, it is divided into multiple smaller channels.

As warm waste fluid 114 travels over the top plate 208, it transfers heat to the tubes 200, since they are in direct contact. FIG. 9 shows that the top walls 404 and bottom walls 406 of the folded fin turbulator 400 are in contact with the square tube 200. As the tube 200 heats up, the top walls 404 and bottom walls 406 also heat up. Since the top walls 404 and bottom walls 406 are connected to the side walls 402, as they heat up, so do the side walls 402. Thus the cold water 110 that travels through the small channels is heated by contacting the side walls 402 shown in FIG. 9. The heat transfer is efficient because of the large heat transfer surface area relative to the volume of fluid in each chamber. Heat transfer is in large part driven by the surface area of the heat transfer space, and this design maximizes that surface area. In so far as that is the case, it is an extension of the a copper plated version of the screw like turbulator mentioned previously, as that design also has a large heat transfer surface area.

DETAILED DESCRIPTION

Another Embodiment

Figure 10:
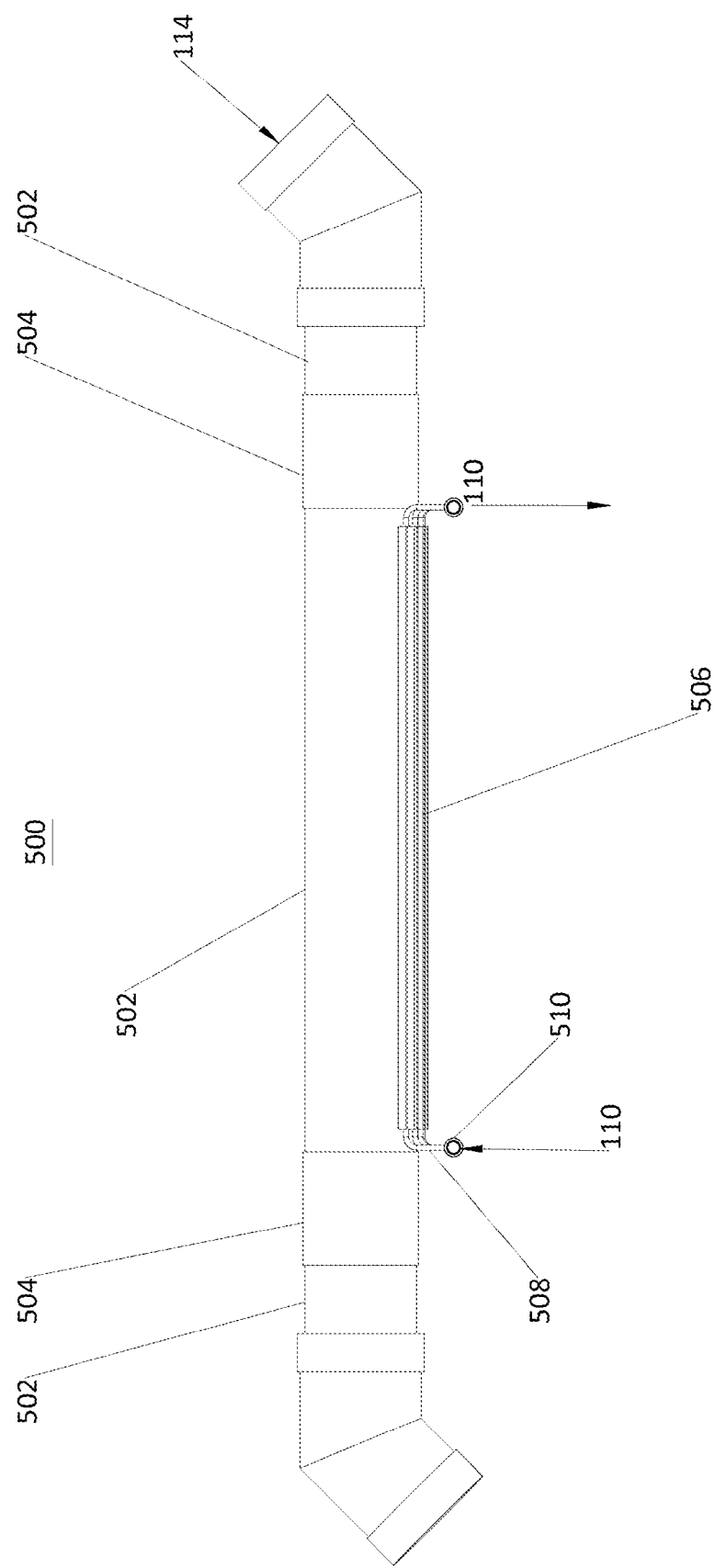
FIG. 10 is a side view of another heat exchanger in a piping system.

FIG. 10 is a side view of a heat exchanger 500. Modified square tubes 506 are connected to the bottom portion of a drain pipe 502. The modified square tubes 506 are connected by hoses 508 to a manifold 510. The drain pipe 502 is connected to other drain pipes 502 in the drainage system by ordinary drain pipe connectors 504. Waste fluid 114 travels inside the drain pipes 502. A cold pressurized fluid 110 travels inside the modified square tubes 506.

Figure 11:
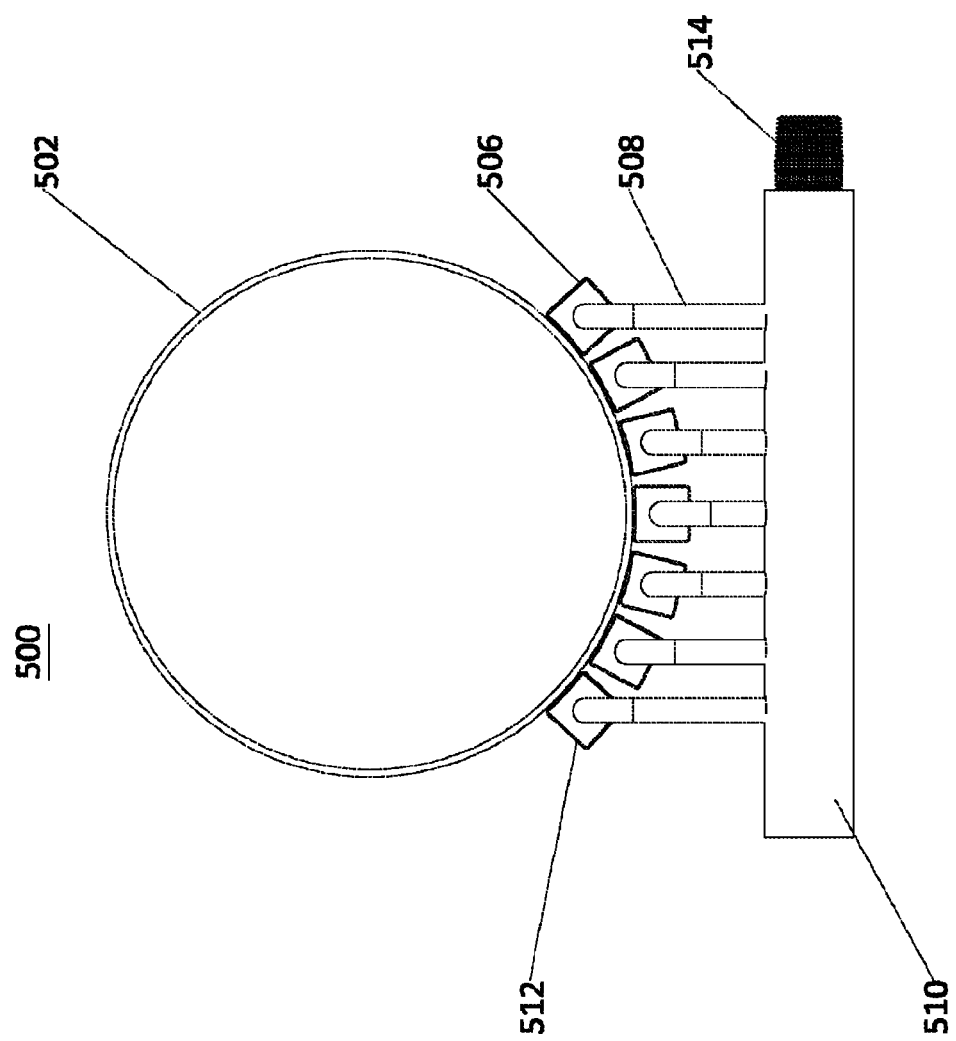
FIG. 11 is a front view of another the heat exchanger.

FIG. 11 depicts a front view of a drain pipe 502. Modified square tubes 506 are attached to the bottom portion of the drain pipe 502. The modified square tubes 506 are connected to hoses 508 via caps 512. The hoses 508 are connected to a manifold 510. The manifold 510 is connected to a fluid connector 514.

Figure 12:
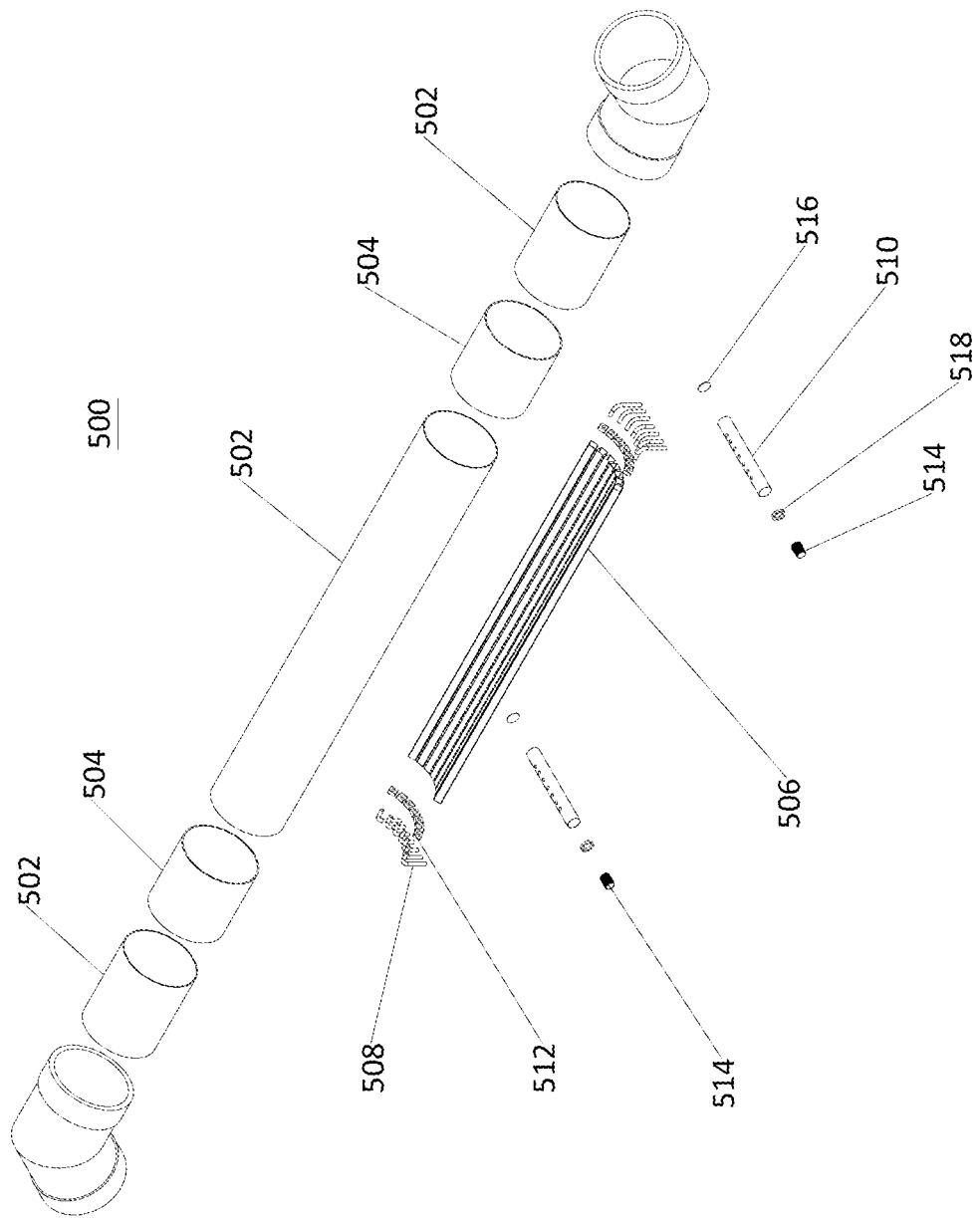
FIG. 12 is an exploded view of another heat exchanger.

FIG. 12 is an exploded view of another heat exchanger 500. Modified square tubes 506 are attached to the bottom portion of a drain pipe 502. Since the modified square tubes 506 have been formed to match the radius of the drain pipe 502, there is good thermal contact. The modified tubes 506 can be attached either by welding, brazing, soldering, or gluing. Turbulators are inserted into each tube 506. The tubes 506 are sealed with caps 512. Each cap 512 has a hole. Hoses 508 connect to the holes in the caps 512 and are joined to a manifold 510 at the other end. The manifold 510 is sealed at one end with a manifold cap 516 and at the other with a connector cap 518. A threaded connector 514 is attached to the connector cap 518. The drain pipe 502 is attached to other drain pipes 502 in the drainage system via drain pipe connectors 504.

Figure 13:
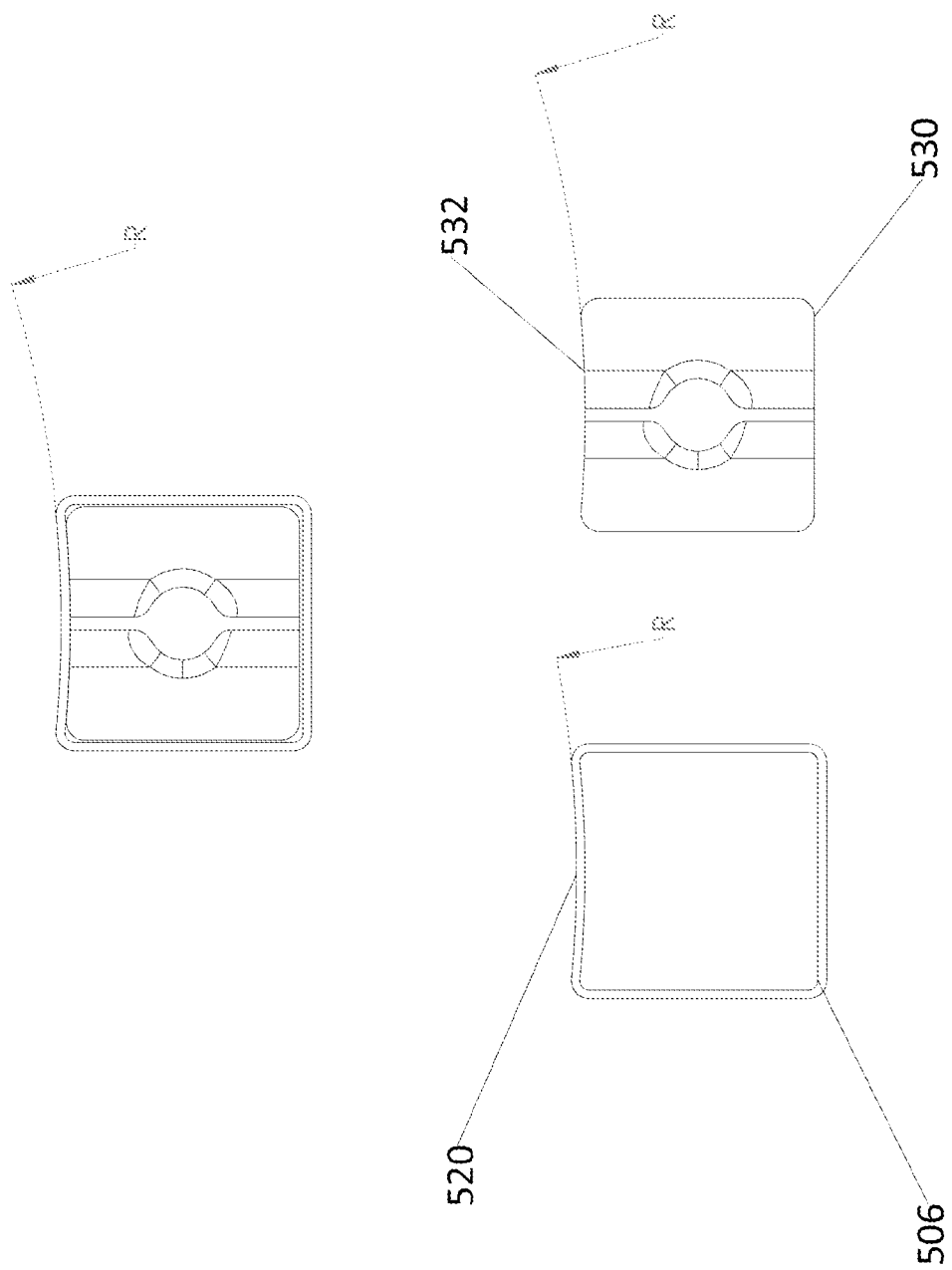
FIG. 13 is a front view of a modified square tube and a modified turbulator.

FIG. 13 shows a front view of a modified tube 506 with a radius bend 520 on the top surface. The radius bend 520 matches the outside curvature of the drain pipe 502 of FIGS. 10, 11 and 12. The radius bend can be made using a brake press. A die shaped like a square with a radius at the top is placed inside the tube. Then a second die with the shape of the outside radius of the tube is attached to the brake press and lowered, forcing the square tube to develop a radius on its top surface. A modified turbulator 530 has a cut 532 into its top section so that it fits snugly into the modified tube 506. The turbulator can be shaped this way directly in the plastic molding process, or it can be later be formed by sanding, cutting or machining.

Figure 14:
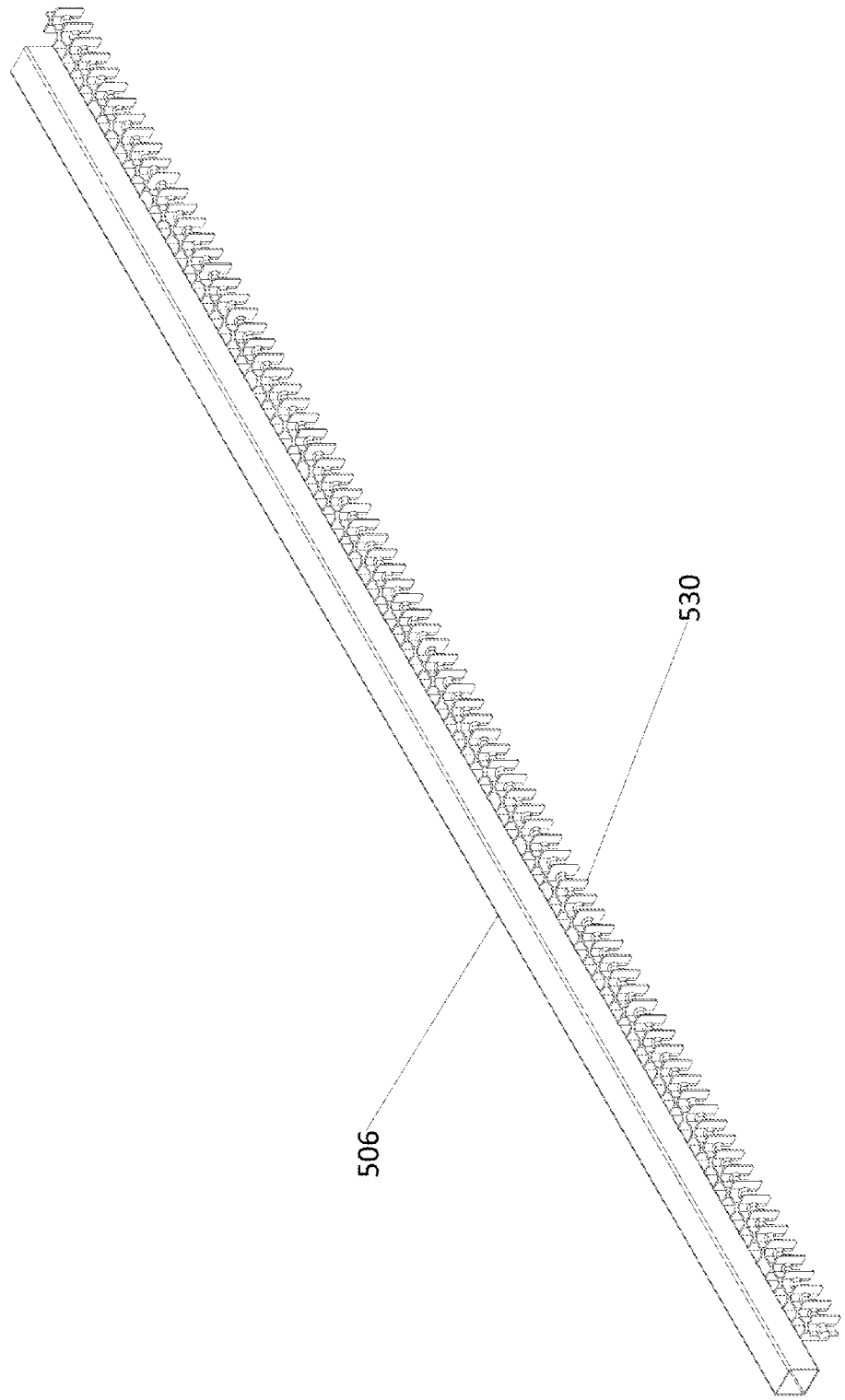
FIG. 14 is an isometric view of a modified turbulator and square tube.

FIG. 14 is an isometric view of the modified square tube 506 alongside the modified turbulator. The modified turbulator 530 goes inside the modified square tube 506 in order to alter the flow paths available to fluids traveling through the modified square tube 506.

Figure 15:
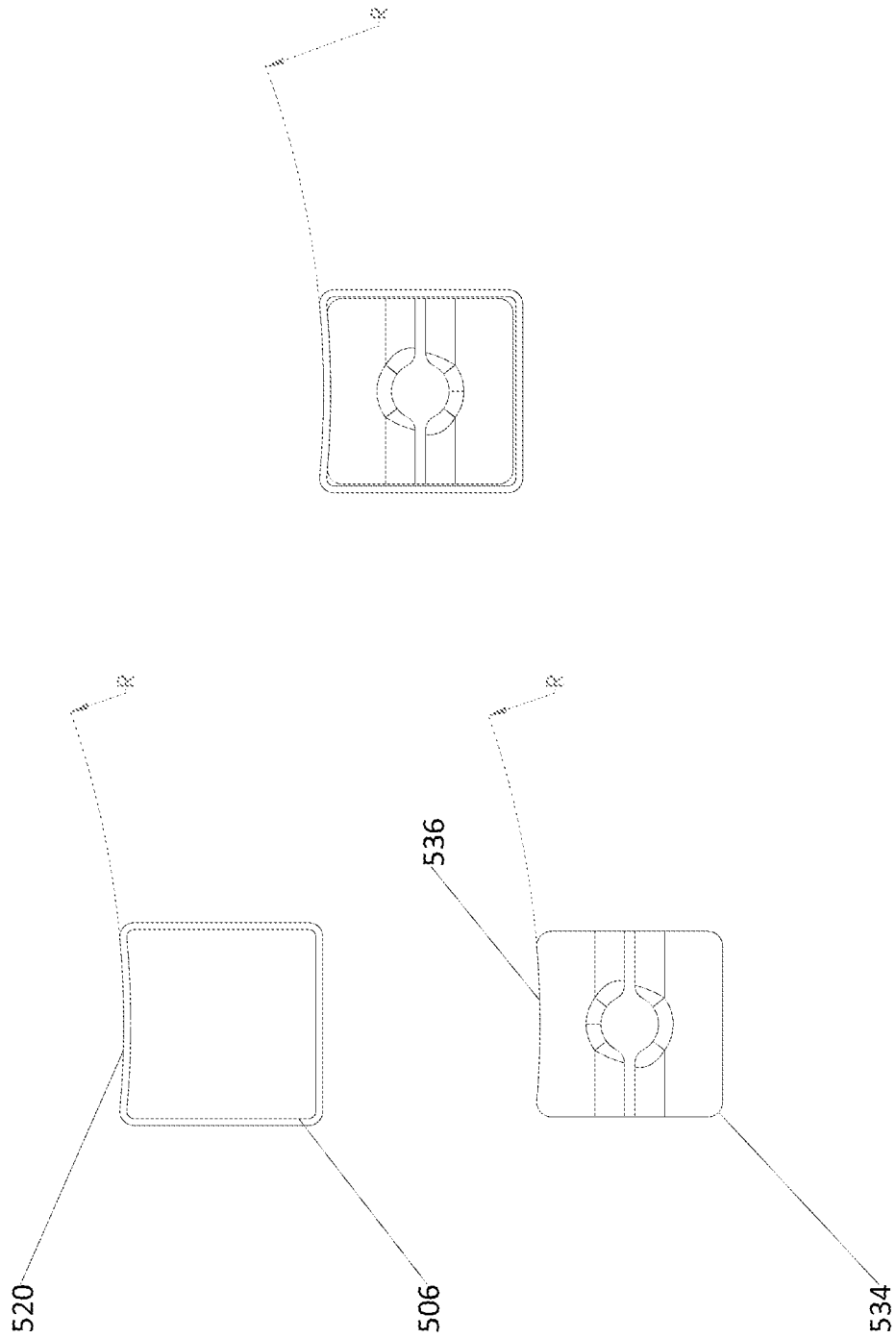
FIG. 15 is a front view of a modified square tube and rotated modified turbulator.

FIG. 15 is a front view of another modified square tube 506 and modified square turbulator 534. In this case, a radial cut 536 had been made in one of the side walls of the modified turbulator 534. The modified turbulator 534 is the rotated 90 degrees around the core so that the side with the radial cut becomes the top so that the modified turbulator 534 can fit snuggly into the modified square tube 506.

Figure 16:
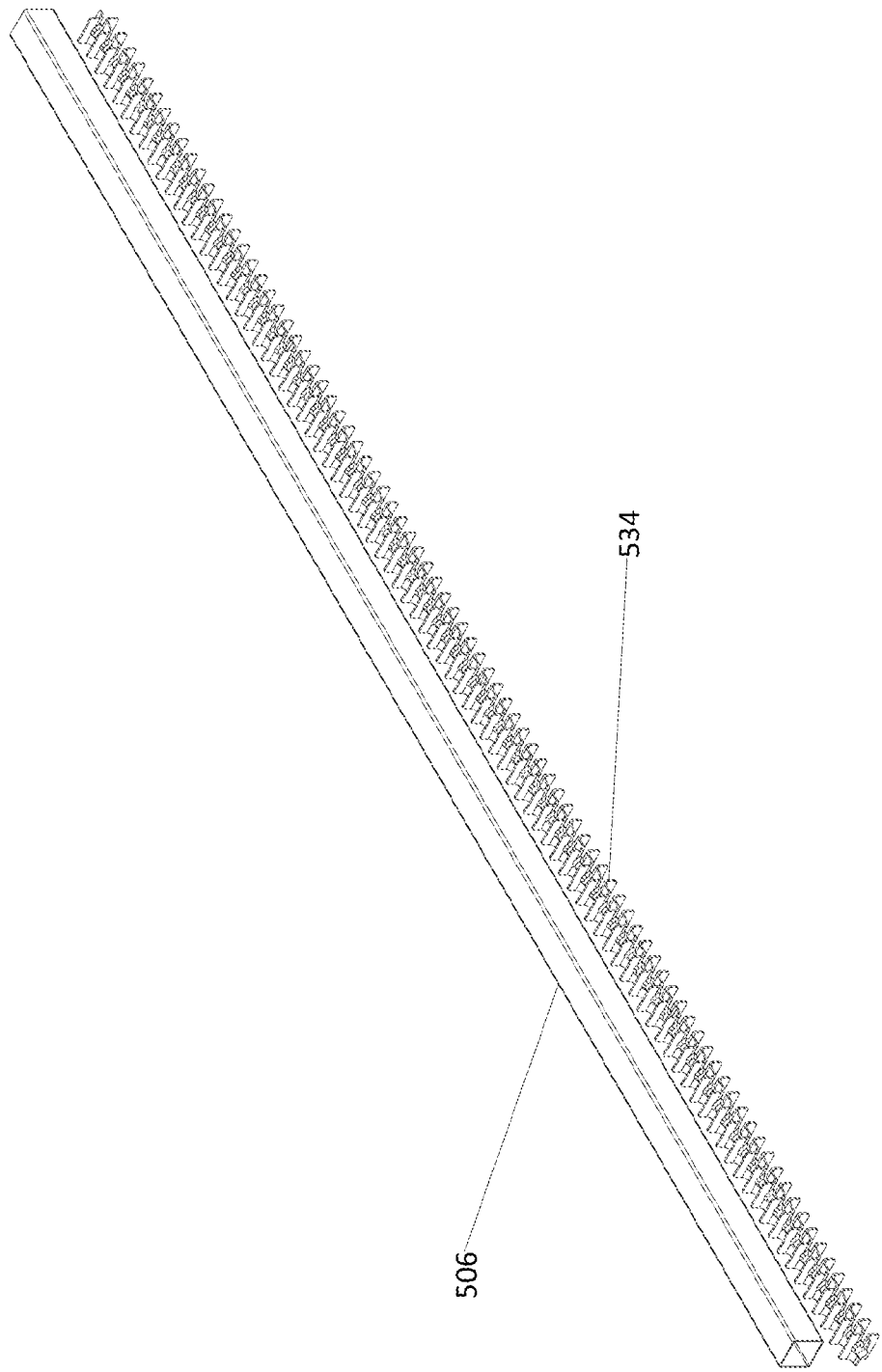
FIG. 16 is an isometric view of a modified square tube and a rotated modified turbulator.

FIG. 16 is an isometric view of modified square tube 506 with a modified square turbulator 534 sitting on its side. The modified turbulator 534 goes inside the modified square tube 506 in order to alter the flow paths available to fluids traveling through the modified square tube 506.

Operation

Another embodiment

FIG. 10 shows a heat exchanger 500 connected to drain pipes 502 by drain pipe connectors 504. Waste water 114 flowing in a drainage system travels inside the portion of the heat exchanger 500 that is made of a standard drain pipe 502. Since drainage systems are typically oversized, waste fluid 114 typically only occupies a portion of the drain pipe 502 at the bottom. Connected to the bottom of the drain pipe 502, in close thermal contact, are modified square tubes 506. A cold pressurized fluid 110 enters a manifold 510 by a connector 514. It travels from the manifold 510 via hoses 508 into the modified square tubes 506. As the cold fluid 110 travels inside the modified square tubes 506, it is heated up by the warm waste fluid traveling in the drain pipe 502. The cold fluid gets preheated by the time it reaches the other end 112 of modified square tubes 506. In some cases a modified turbulator 530 or 534 is inside each of the modified square tubes 506. As the cold fluid 110 passes through the modified square tubes 506, the modified turbulator 530 or 534 forces it to take a circuitous and helical path, increasing the heat transfer characteristics and dwell time of the cool fluid 110 as it is inside the heat exchanger. In other cases, a folded fin turbulator 400 in FIGS. 8.A., 8.B. and 9, boosts the heat transfer in the modified square tubes 506 by forcing the cool fluid 110 into small channels with large heat transfer surface areas.

DETAILED DESCRIPTION

Another Heat Exchanger

Figure 17:
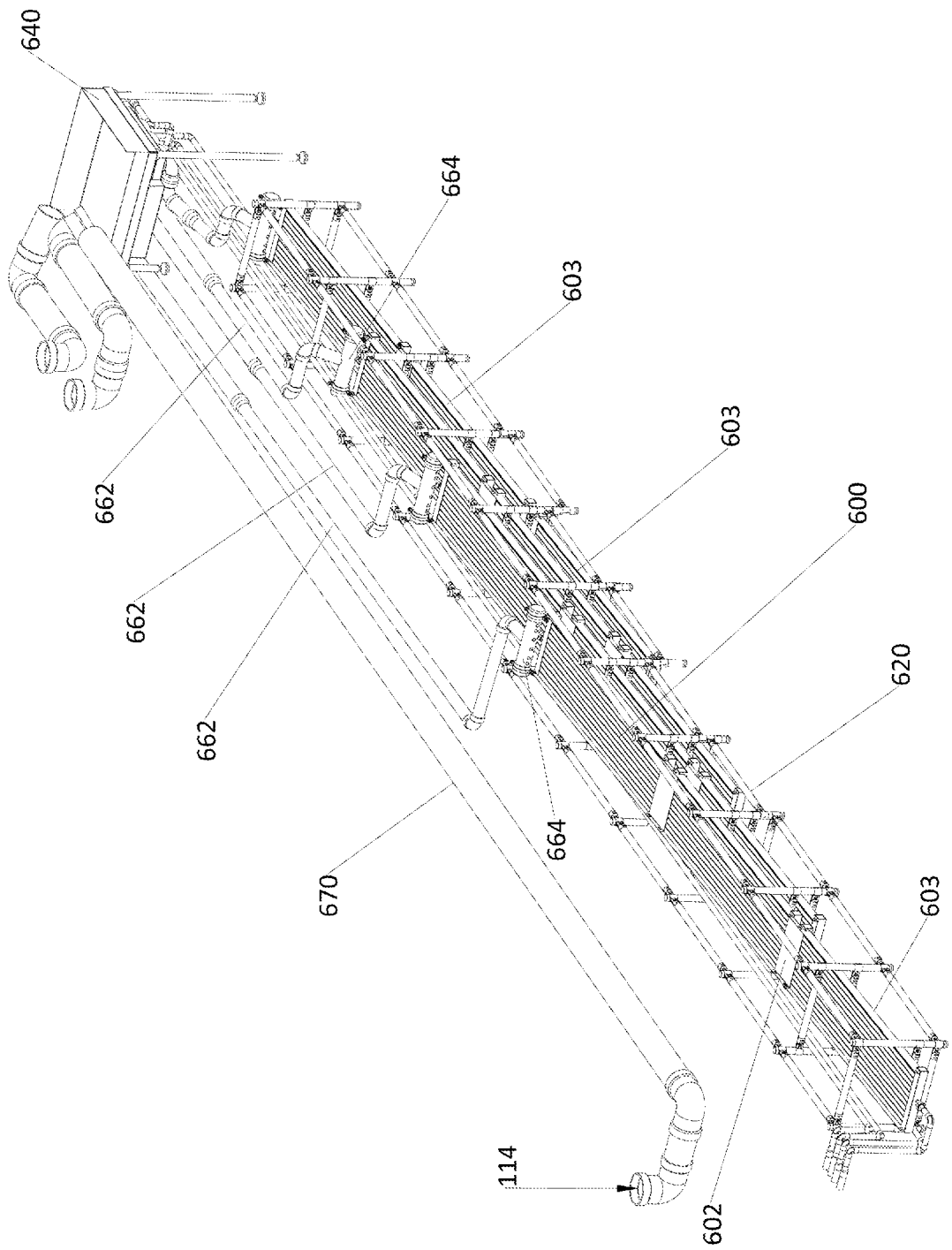
FIG. 17 is an isometric view of a modular heat exchanger.

FIG. 17 is an isometric view of a modular variation of the heat exchangers discussed previously. Individual heat exchange panels 600 are connected via intermediate plates 602 to form series heat exchanger chains 603. A series heat exchanger chain as described herein is a group of heat exchange panels 600 connected in series, to create the effect of one longer heat exchange panel. In some cases, it is more convenient in terms of construction, shipping and installation, to work with shorter heat exchanger panels that can be handled by a single person. However, length of the heat exchange panels is an important factor in the overall ability of the heat exchanger to recover heat. Thus it is sometimes desired to have short panels for fabrication and installation, but that can be combined to make a longer panel on-site.

The heat exchange panels 600 rest on a support structure 620. Waste fluid 114 from an industrial process travels through an exit drain pipe 670 into a distributor 640. The purpose of the distributor is to condition and divide the flow. In some cases, the flow exiting an industrial process may be discontinuous. The distributor serves to take the discontinuous flow and exit a continuous flow which is more practical for heat recovery. Additionally the distributor serves to divide the flow. In some cases, an industrial process exits a flow that is larger than that which can be handled by a single series heat exchanger chain. The heat transfer relies on a predetermined amount of waste fluid per width of heat exchange panel 600. If there is too much flow relative to the width of the panel, much of the flow will pass over the heat exchanger surfaces without contacting them. In these cases, it is desirable to add more width to the heat exchanger panels, by adding parallel series heat exchanger chains.

Thus the waste fluid 114 flow is divided in the distributor 640 and travels through waste fluid pipes 662 to a flow spreader 664. The flow spreader 664 is simply a round tube capped at both ends, and with holes at a downward position along the length of the tube.

Figure 18:
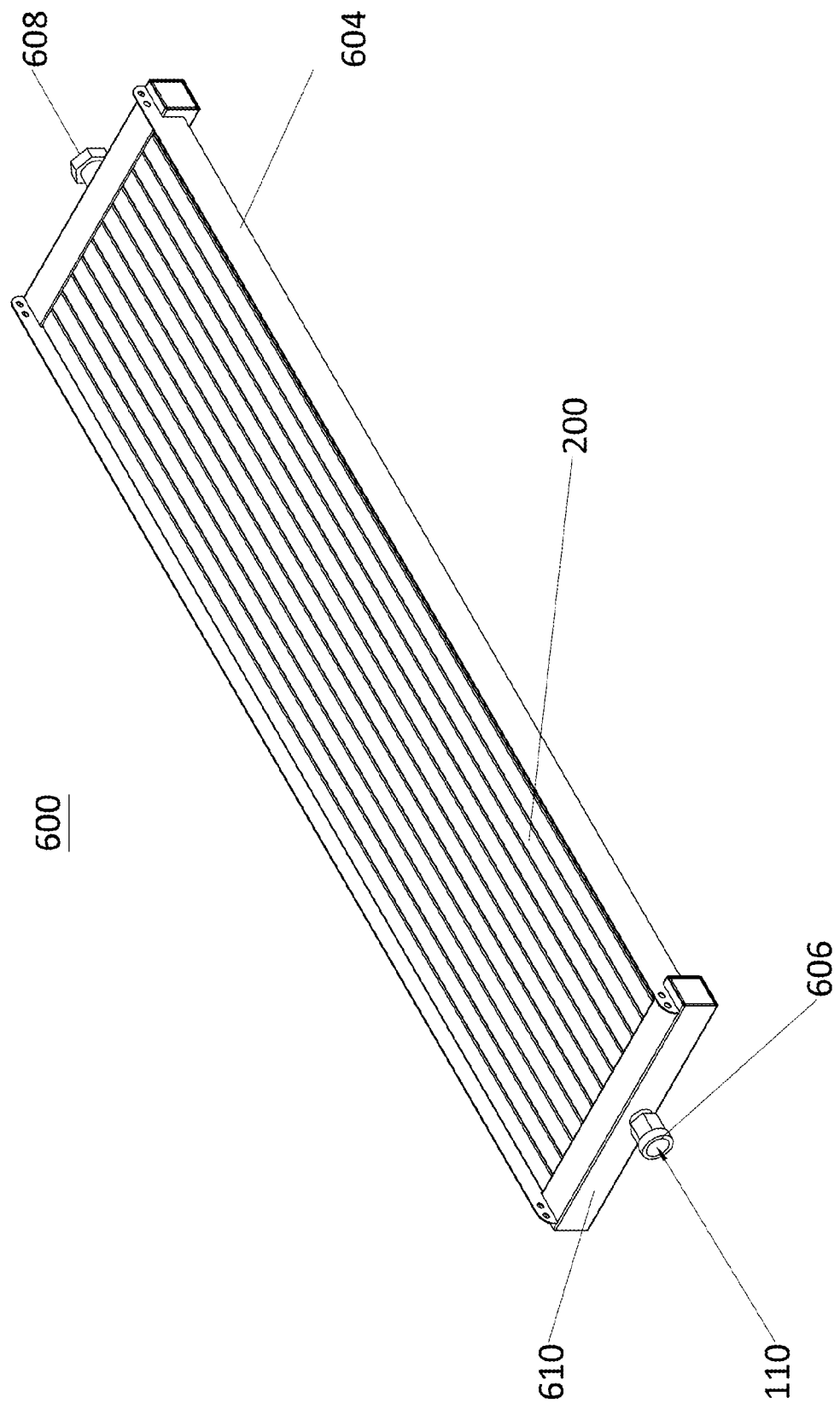
FIG. 18 is an isometric view of a heat exchange panel.

FIG. 18 provides more detail of the heat exchange panel 600. Substantially square tubes 200 are connected at each end to a manifold 610. The manifold 610 can be any of the manifolds previously discussed and the joining methods can also be any of those previously discussed. Turbulators as discussed previously can be inserted into the tubes prior to joining the manifolds. One manifold has a male union 606 and the other has a female union 608, both facing outwards away from the heat exchange panel 600. A cut sheet of metal or plastic called a side panel 604 is joined to the outside of the two outer square tubes 200.

Figure 19:
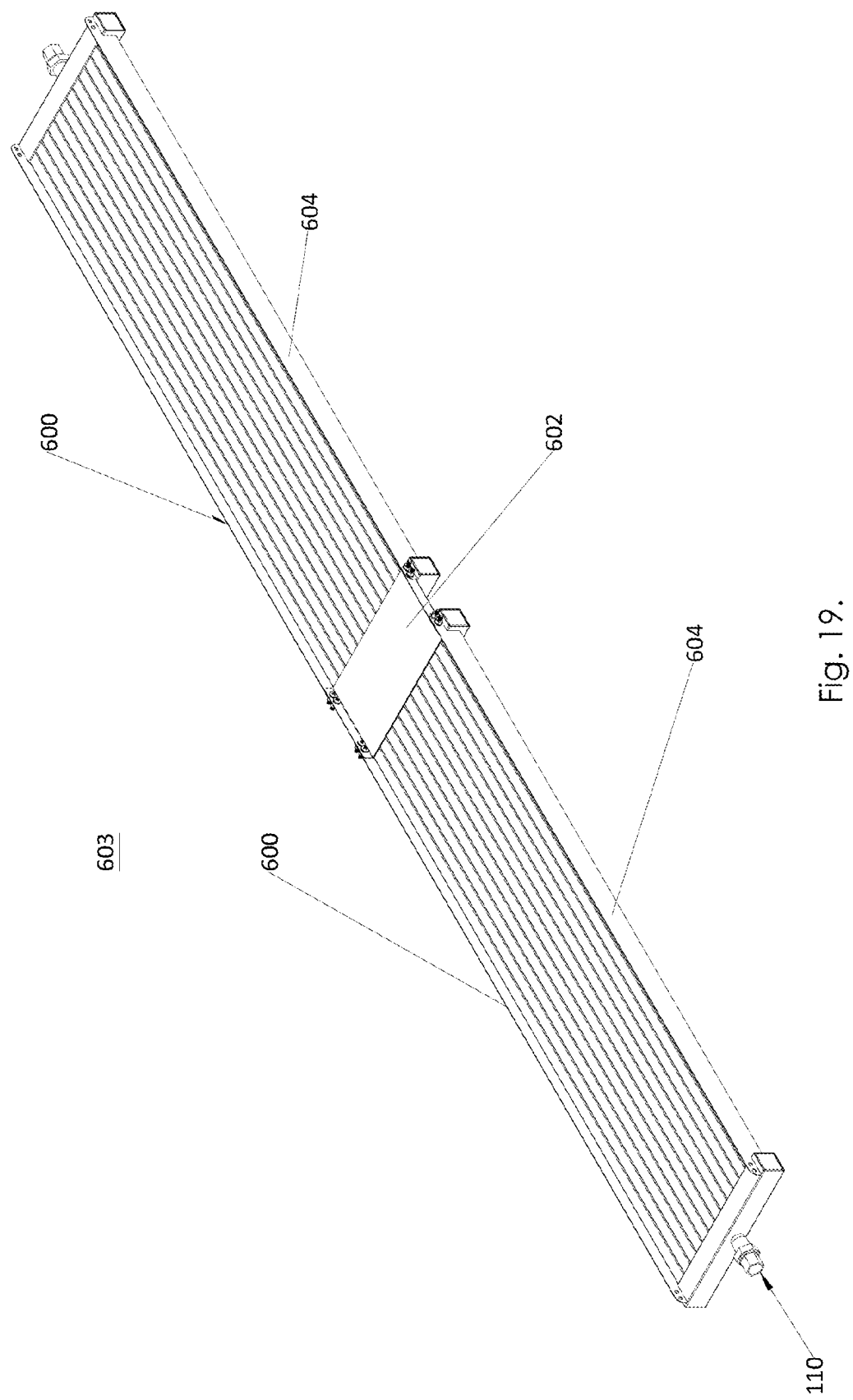
FIG. 19 is an isometric view of consecutive heat exchange panels joined together.

FIG. 19 shows two heat exchange panels 600 joined together with an intermediate plate 602. The plate 602 is bolted to the side panel 604 via the holes. A caulking material can be used to seal the intermediate plate 602 to the side panels 604 and the top of the manifold 610.

Figure 20:
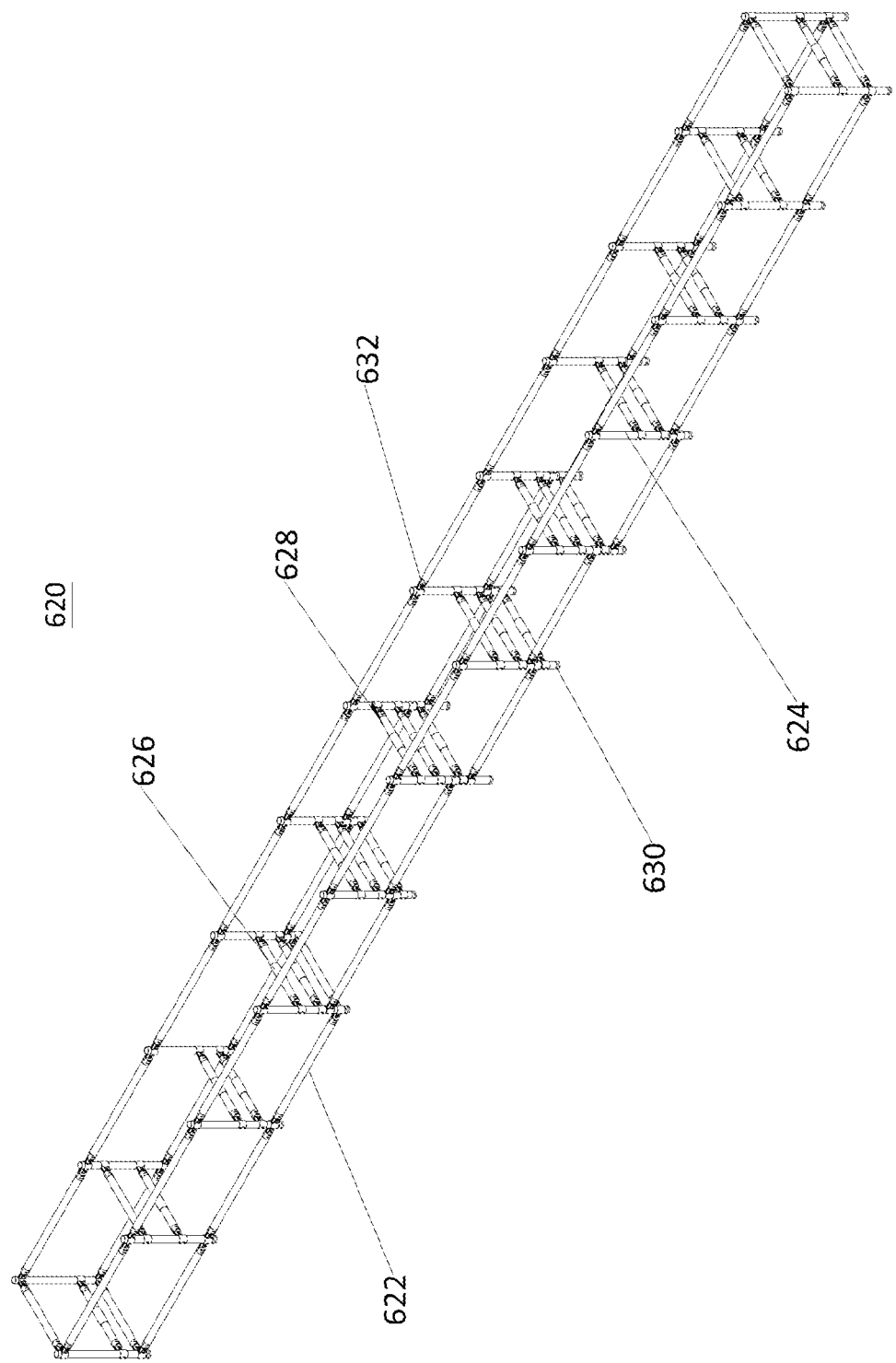
FIG. 20 is an isometric view of a support structure.

FIG. 20 is an isometric view of the support structure 620. The support structure is made up of pipes and t-joints such as those found in a common lean-pipe system. Pipes are cut to length to form side beams 622, vertical beams 624 and center beams 626. The vertical beams have adjustable rubber feet 630. T-joints 632 are used to clamp the side beams 622 to the vertical beams 624. T-joints 632 are also used to clamp the center beams 626 to the vertical beams 624. The center beams 626 are wrapped in insulation 628 such as a rubber tube. The heat exchange panels 600 of FIGS. 17, 18 and 19, are deposited onto the insulation 628 of the center beams 626. The insulation 128 provides grip to keep the panels 600 in place, and also to prevent galvanic corrosion in the case where the material for the support structure 620 and heat exchange panels are dissimilar metals. The vertical positioning of the center beams 626 allows the heat exchanger panels to have a predetermined slope.

Figure 21:
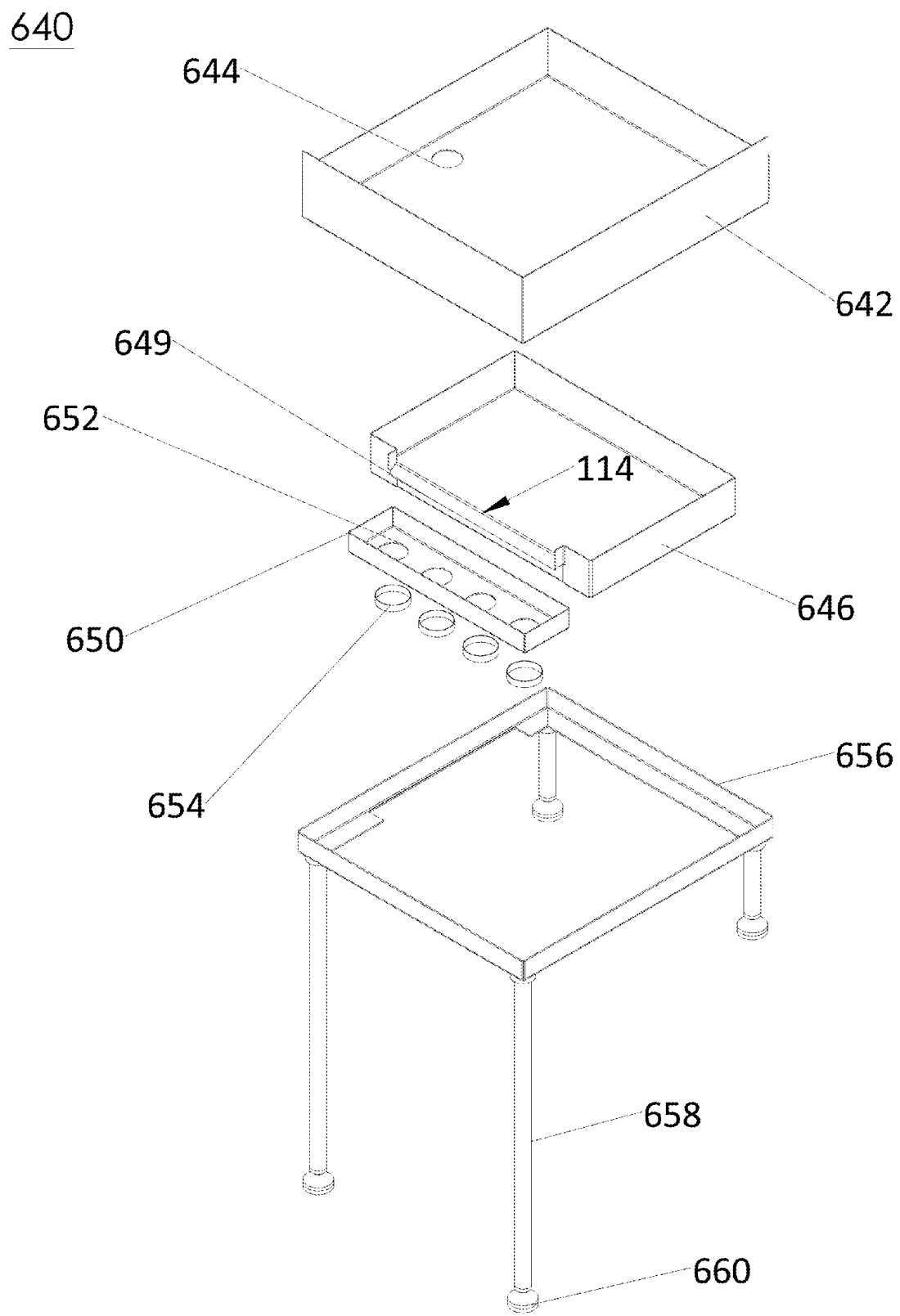
FIG. 21 is an exploded view of a waste fluid distributor.

FIG. 21 is an exploded view of the distributor 640. A receiver basin 642 in the form of a pan has a basin hole 644 in its floor. Beneath the receiver basin 642, and joined to the bottom surface of its floor, is a distributor basin 646 which is another pan. The distributor basin 646 has one lowered side wall 648 and an overflow panel 649. The distributor basin 646 is connected to another pan called the flow divider pan 650. One of the longitudinal walls of the flow divider pan 650 is connected to the lowered side wall 648 of the distributor basin 646. The flow divider pan 650 has equally sized flow divider holes 652 through its bottom surface. The holes 652 are attached to drain line connectors 654 which are just short sections of pipe.

Operation

Another Embodiment

A discontinuous waste fluid 114 exits an industrial process 114 via an exit drain pipe 670 shown in FIG. 17 into a distributor basin 640. As mentioned previously, the distributor basin serves to condition and divide the waste fluid 114. The discontinuous fluid 114 first drops into the receiver basin 642 shown in FIG. 21. Fluid exits via gravity through the basin hole 644. The hole is sized such that there is a continuous flow at a constant rate exiting through the basin hole 644. As an example, if a fluid exits a process with a flow of 50 gallons per minute flow for 1 second and then pauses for 1 second, and repeats this cycle continuously, there will be a continuous flow of 25 gallons per minute exiting through the basin hole 644 into the distributor basin 646. As waste fluid 114 accumulates in the distributor basin 646, it reaches the level of the lowered side wall 648. It overflows this lowered side wall 648, passing over the overflow panel 649 and drops equally into the flow divider holes 652 of the flow divider pan 650. The holes 652 are attached via connectors 654 to the waste fluid pipe 662 shown in FIG. 17.

In the present description, there are four independent series heat exchanger chains 603. In the present description, each series heat exchanger chain 603 comprises three heat exchange panels 600. The number of independent chains and heat exchange panels can vary according to the specific application. The flow rate of the waste water will determine the number of independent chains 603. It is often convenient to divide the flow of a high flow rate waste fluid stream into smaller separate flows that are easier to manage by the heat exchange panels 600. The number of heat exchange panels 600 in each chain will depend on the space available and also the desired heat transfer efficiency. A longer chain, with more heat exchange panels will provide more heat transfer than a shorter chain, all other things being equal.

The waste fluid 114 travels through the waste fluid pipes 662 into the flow spreaders 664. Each flow spreader 664 drops waste fluid 114 evenly across the uppermost end of the first heat exchange panel 600 in each series heat exchanger chain 603. The waste fluid 114 travels on top of the tubes 200 by the force of gravity, since the heat exchange panels 600 are sloped downwards. The waste fluid 114 travels from the first panel to the second in the series via an intermediate plate 602. The waste water continues until it reaches the far end of the last panel.

Cold fluid 110 enters simultaneously into the first heat exchange panel in each series heat exchanger chain 603. It enters via the male union 606. The cold fluid travels inside the first manifold 610, into the square tubes 200, to the other side. The cold fluid 110 is pressurized either by a pump or other means prior to entering the heat exchanger panels 600. The pressurized fluid 110 travels to the manifold 610 at the opposite end and exits via a female union 608 into the male connector 606 of the next heat exchange panel in the series. As the cold fluid travels inside these tubes 200, it is heated by the waste fluid 114 traveling over the top of the tubes 200. Thus the cold fluid exits the heat exchange panels preheated by the waste fluid. As in the other heat exchangers, turbulators may be inside the tubes performing the same function as previously discussed.

It should be noted that in the case where the waste fluid 114 exits a process continuously, the receiver basin 642 depicted in FIG. 20 is not required. In the case where the waste fluid flow rate is low compared to the available width for the heat exchanger panels 600, the distributor may not be required at all as a single series heat exchanger chain can recover heat effectively.

It should be noted as well that once again the tubes are parallel to the flow, without any bending required, and so the construction is simple and cost effective.

I claim:

1. A heat exchanger comprising:
a first elongated conduit in fluid communication with a first inlet at one end thereof and with a first outlet at an opposed end thereof, the first conduit including a bottom wall; and
a plurality of second elongated conduits extending along and parallel to the first conduit, each of the second conduits having a square cross-section, each of the second conduits having a conduit inlet directly connected with a second inlet at one end thereof, and having a conduit outlet directly connected with a second outlet at an opposed end of said second conduit, each of the second conduits including a top wall having a shape complementary to that of the bottom wall of the first conduit, each of the second conduits being retained against the first conduit with the top wall of the second conduits adjacent to the bottom wall of the first conduit and disposed in heat exchange relationship therewith, each of the second conduits having a turbulator therein defining at least two alternating flow paths having a length greater than that of the second conduit, the turbulator having a core extending along a longitudinal direction of the second conduit and a plurality of side wall pairings, the side walls in each side wall pairing being longitudinally offset and extending in opposite directions from the core transversely and perpendicularly to the longitudinal direction, the side wall pairings being in contact with a corresponding one of inner wall surfaces of the second conduit, adjacent side wall pairings being spaced apart along the longitudinal direction and defining a chamber therebetween, the turbulator having a plurality of in-line walls, each of the in-line walls extending longitudinally between the side walls of a corresponding side wall pairing, the in-line walls extending from the core along the longitudinal direction and being transverse to the side walls, the in-line walls being in contact with a corresponding one of the inner wall surfaces of the second conduit, for each of the at least two distinct flow paths, adjacent chambers being in fluid communication with one another through gaps defined in each of the side-wall pairings.

2. The heat exchanger as defined in claim 1, wherein the turbulator in each of the second conduits has a screw-like shape defining the at least two alternating flow paths as at least two helical flow paths.

3. The heat exchanger as defined in claim 1, wherein the gaps fluidly communicating the adjacent chambers with one another are the only gaps and are alternating bottom and top gaps defined above and below the core in each of the side-wall pairings.

4. The heat exchanger as defined in claim 1, wherein the first conduit and the second conduits are oriented horizontally.

5. The heat exchanger as defined in claim 1, wherein the second conduits extend side by side and are joined together at each end by sealing along mating faces thereof.

6. The heat exchanger as defined in claim 1, wherein the bottom wall of the first conduit and the top wall of each of the second conduits have a complementary curved shape.

7. The heat exchanger as defined in claim 1, wherein the heat exchanger includes a box body having a top portion defining part of the first conduit and a bottom portion receiving the plurality of second conduits therein.

8. A waste water heat recovery system including a heat exchanger as defined in claim 1, and further comprising a grey water source connected to the first inlet, a drain pipe connected to the first outlet and a cold water source connected to the second inlet.

9. A heat exchanger comprising:

a plurality of elongated conduits extending side by side and each having a conduit inlet directly connected with an inlet at one end thereof, and a conduit outlet directly connected with an outlet at an opposed end of said conduit, each of the conduits having a square cross section and including a top wall defining a heat exchange surface; and a turbulator received in each of the conduits, each turbulator defining at least two alternating flow paths having one or both of a length greater than that of a respective one of the conduits and a cross-sectional area smaller than that of the respective one of the conduits, the turbulator having a core extending along a longitudinal direction of the conduit and a plurality of side wall pairings, the side walls in each side wall pairing being longitudinally offset and extending in opposite directions from the core transversely and perpendicularly to the longitudinal direction, the side wall pairings being in contact with a corresponding one of inner wall surfaces of the conduit, adjacent side wall pairings being spaced apart along the longitudinal direction and defining a chamber therebetween, the turbulator having a plurality of in-line walls, each of the in-line walls extending longitudinally between the side walls of a corresponding side wall pairing, the in-line walls extending from the core along the longitudinal direction and being transverse to the side walls, the in-line walls being in contact with a corresponding one of the inner wall surfaces of the corresponding conduit, for each of the at least two distinct flow paths, adjacent chambers being in fluid communication with one another through gaps defined in each of the side-wall pairings.

10. The heat exchanger as defined in claim 9, wherein each turbulator has a screw-like configuration defining the at least two alternating flow paths as at least two helical flow paths.

11. The heat exchanger as defined in claim 9, wherein the gaps fluidly communicating the adjacent chambers with one another are the only gaps and are alternating bottom and top gaps defined above and below the core in each of the adjacent side-wall pairings.

12. The heat exchanger as defined in claim 9, wherein the elongated conduits abut one another with their top heat exchange surfaces adjacent to a bottom wall of an additional conduit, wherein the elongated conduits are in heat exchange relationship with the additional conduit.

13. The heat exchanger as defined in claim 12, wherein the elongated conduits and the additional conduit are parallel to each other and are both oriented horizontally.

14. The heat exchanger as defined in claim 12, wherein the top heat exchange surfaces of the elongated conduits have a shape complementary to the bottom wall of the additional conduit.

15. A heat exchanger comprising:

a plurality of elongated conduits extending side by side and each having a conduit inlet directly connected with an inlet at one end thereof, and a conduit outlet directly connected with an outlet at an opposed end of said conduit, each of the conduits including a wall defining a heat exchange surface; and a turbulator received in each of the conduits, each turbulator defining at least two alternating flow paths having one or both of a length greater than that of a respective one of the conduits and a cross-sectional area smaller than that of the respective one of the conduits, the turbulator having a core extending along a longitudinal direction of the conduit and a plurality of side wall pairings, the side walls in each side wall pairing being longitudinally offset and extending in opposite directions from the core transversely and perpendicularly to the longitudinal direction, the side wall pairings being in contact with a corresponding one of inner wall surfaces of the conduit, adjacent side wall pairings being spaced apart along the longitudinal direction and defining a chamber therebetween, the turbulator having a plurality of in-line walls, each of the in-line walls extending longitudinally between the side walls of a corresponding side wall pairing, the in-line walls extending from the core along the longitudinal direction and being transverse to the side walls, the in-line walls being in contact with a corresponding one of the inner wall surfaces of the corresponding conduit, for each of the at least two distinct flow paths, adjacent chambers being in fluid communication with one another through gaps defined in each of the side-wall pairings.

16. The heat exchanger as defined in claim 15, wherein each turbulator has a screw-like configuration defining the at least two alternating flow paths as at least two helical flow paths.

17. The heat exchanger as defined in claim 15, wherein the gaps fluidly communicating the adjacent chambers with one another are the only gaps and are alternating bottom and top gaps defined above and below the core in each of the side-wall pairings.

18. The heat exchanger as defined in claim 15, wherein the elongated conduits abut one another with their heat exchange surfaces adjacent to a wall of an additional conduit, wherein the elongated conduits are in heat exchange relationship with the additional conduit.

19. The heat exchanger as defined in claim 18, wherein the elongated conduits and the additional conduit are parallel to each other and are both oriented horizontally.

20. The heat exchanger as defined in claim 18, wherein the heat exchange surfaces of the elongated conduits have a shape complementary to the wall of the additional conduit.

* * * * *